(12) United States Patent
Yoshida

(10) Patent No.: US 7,254,179 B2
(45) Date of Patent: Aug. 7, 2007

(54) DECODING FOR PEAK-POWER REDUCTION AND ERROR-CORRECTION CAPABILITIES IN MULTICARRIER TRANSMISSION

(75) Inventor: Makoto Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 734 days.

(21) Appl. No.: 10/704,435

(22) Filed: Nov. 7, 2003

(65) Prior Publication Data
US 2004/0101061 A1 May 27, 2004

Related U.S. Application Data

(62) Division of application No. 09/882,907, filed on Jun. 15, 2001, now Pat. No. 6,678,335.

(51) Int. Cl.
H04K 1/10 (2006.01)
H04L 27/28 (2006.01)

(52) U.S. Cl. ........................ 375/260; 375/296

(58) Field of Classification Search .......... 375/260, 375/296
See application file for complete search history.

(56) References Cited

U.S. PATENT DOCUMENTS

| | | | |
|---|---|---|---|
| 5,329,552 A | 7/1994 | de Couasnon et al. | |
| 5,636,247 A | 6/1997 | Kamerman et al. | |
| 5,841,813 A | 11/1998 | van Nee | |
| 6,301,221 B1 * | 10/2001 | Paterson | 370/208 |
| 6,307,892 B1 * | 10/2001 | Jones et al. | 375/296 |

(Continued)

FOREIGN PATENT DOCUMENTS

EP 0 702 466 3/1996

(Continued)

OTHER PUBLICATIONS

Van Nee, Richard D. J.: OFDM Codes for Peak-To-Average Power Reduction and Error Correction, Global Telecommunications Conference, 1996. Globecom '96. Communications: The Key To Global Prosperity London, UK Nov. 18-22, 1996, New York, NY, USA, IEEE, US, vol. 1, (Nov. 18, 1996), pp. 740-744, XP010220450 ISBN: 0-7803-3336-5 *abstract*.

(Continued)

*Primary Examiner*—David C. Payne
*Assistant Examiner*—Nader Bolourchi
(74) *Attorney, Agent, or Firm*—Katten Muchin Rosenman LLP

(57) ABSTRACT

An input signal is encoded using a multicarrier code that provides a PEP reduction of 3k [dB] and a minimum distance $d_{min} = \sqrt{2^k} d$, by restricting the code so as to have one or more $2^{k+1}$-carrier kernels in which $|\Delta\theta(2^k) - \Delta\theta^*(2^k)| \equiv \pi$ (for any k) holds for the phase difference $\Delta\theta(2^k)$ between a set of $2^{k-1}$ carriers and another set of $2^{k-1}$ carriers and the phase difference $\Delta\theta^*(2^k)$ between a set of $2^{k-1}$ carriers and another set of $2^{k-1}$ carriers, where k is an integer not smaller than 1. By setting k to 1, and by further providing the condition $|\Delta\theta(2^k) - \Delta\theta^*(2^k)| = \pi/2$ between two kinds of 4-carrier kernels one equal in number to the other, a PEP reduction of 3.7 dB and $d_{min} = \sqrt{2} d$ can be achieved. By extending the code length using these two kinds of 4-carrier kernels as basic units, a PEP reduction of 3k+0.7 [dB] and $d_{min} = \sqrt{2^k} d$ can be achieved.

2 Claims, 23 Drawing Sheets

U.S. PATENT DOCUMENTS 6,373,859 B1 * 4/2002 Jedwab et al. .............. 370/479

FOREIGN PATENT DOCUMENTS

| EP | 0 702 466 A2 | 3/1996 |
| EP | 0 828 365 | 3/1998 |
| EP | 0 828 365 A2 | 3/1998 |
| EP | 0 869 646 A2 | 10/1998 |
| EP | 0 902 574 A2 | 3/1999 |
| JP | 48-83716 | 11/1973 |

OTHER PUBLICATIONS

European Search Report with Annex dated Nov. 21, 2005.

* cited by examiner

☐ $A_2$   ▨ $B_2$   ⋯ $A'_2(=A_2)$   ▧ $B'_2(=\bar{B}_2)$

☐ $A_3$   ▨ $B_3$   ⋯ $A'_3(=A_3)$   ▧ $B'_3(=\bar{B}_3)$

DECODING FOR PEAK-POWER REDUCTION AND ERROR-CORRECTION CAPABILITIES IN MULTICARRIER TRANSMISSION

CROSS-REFERENCE TO RELATED APPLICATION

The present application is a divisional application of and claims priority under 35 U.S.C. § 120 from U.S. patent application Ser. No. 09/882,907, which was filed on Jun. 15, 2001 now U.S. Pat. No. 6,678,335 and is hereby incorporated by reference.

This application is based upon and claims the priority of Japanese Patent Application No. 10-361591, filed Dec. 18, 1998, the contents being incorporated therein by reference, and is a continuation of PCT/JP99/07123.

TECHNICAL FIELD

The present invention relates to a method and apparatus for encoding for multicarrier transmission, and for decoding for the same.

BACKGROUND ART

In wideband wireless communications, frequency-selective, or multipath, fading is a particular problem as it degrades channel quality. Multicarrier modulation is an effective technique to combat multipath fading. In this modulation scheme, the transmission bandwidth is divided into a plurality of carriers (called subcarriers) to utilize the frequency diversity in a frequency-selective fading environment and thereby enable high-quality wireless transmission. Orthogonal Frequency Division Multiplexing (OFDM) is also included in this technique.

A main disadvantage of the multicarrier technique is that multicarrier signals inherently exhibit a high peak power (or peak-to-average power ratio). Linear amplifiers having a wide dynamic range are needed to maintain system linearity. However, linear amplifiers are not only expensive, but their power efficiency is also very low. On the other hand, using inexpensive nonlinear amplifiers involves the problem of nonlinear distortion, resulting in degradation of performances, since these amplifier are operated in their saturation regions. These problems have been regarded as a bottleneck impeding the commercial implementation of this technique.

There are two main approaches to solving these problems: (1) by restricting the signal input and (2) by restricting the signal output. The former approach, mainly employing coding technique, is performed so as not to produce signal patterns that increase peak power, and no degradation in performances occurs. Furthermore, if the minimum distance of the code can be increased, it is also possible to improve the bit-error rate—BER performance. The latter approach, such as clipping technique which clips the signal before amplification, is also an effective technique for the peak reduction. This is because the large peaks occur with very low probability. This technique however causes both the BER performance degradation and the spectral efficiency reduction. There is also a technique that normalizes the entire signal envelope level to the threshold value, but this also causes the performance degradation due to the loss of the S/N ratio. The former technique is therefore preferred for providing wideband high-quality wireless transmission.

Complementary sequence (complementary code) has the proper of both peak reduction and error correction, and is being studied for application to the multicarrier modulation scheme. This code can be applied to M-ary phase shift keying (MPSK) modulation. This code achieves the coding rate $R=(\log_2 N+1)/N$, the minimum distance $d_{min}=\sqrt{N/2}\ d$, and the peak power $P_{pep}=2/N\ P(N)$ in the case of N carriers, where d is the minimum distance between signal points, and $P(N)\ (=N^2)$ is the peak power of N carriers without coding. For example, in the case of four carriers, $R=\frac{3}{4}$, $dmin^2=2d^2$, and $P_{pep}=P(4)/2$, while in the case of eight carriers, $R=\frac{1}{2}$, $dmin^2=4d^2$, and $P_{pep}=P(8)/2$. Accordingly, since the coding rate of complementary code decreases as the number of carriers increases, degradation in transmission efficiency is unavoidable even if the improvement of the error-correction capability is considered. It is of course possible to operate the system as a four-carrier system by dividing the eight carries into two four carriers, but if this technique is used, the coding rate of $R>\frac{3}{4}$ is not available.

On the other hand, N carriers are represented by $M^N$ signal patterns (M is the number of modulated signal points). It is well known to reduce peak power by measuring the peak envelope power (PEP) levels of all signal patterns, ranking them in the order of envelope levels and encoding using only the patterns in the lower half of the ranking. This means that the peak power can be reduced by adding only one redundant bit. Moreover, the reduction effect, $\Delta P_{PEP}$ (10 log $(P(N)/P_{pep})[dB]$), achieved by this one-bit redundancy increases as N is increased. Therefore, increasing N should, in effect, lead to an increase in coding rate. However, in the above-described complementary code, the coding rate decreases with increasing N; therefore, it cannot fully meet this phenomenon. It should also be noted that, with the technique that uses the patterns in the lower half of the PEP ranking, the error-correction capability cannot be obtained. Furthermore, since there is no logical between the signal input and the code assigned to it, logic circuits cannot be used, which leaves no other choice but to use a mapping memory such as a ROM. Using a mapping memory becomes unrealistic when the number of carriers increases.

DISCLOSURE OF THE INVENTION

In view of the above circumstances, it is an object of the present invention to achieve high-efficiency transmission by providing a code whose coding rate increases with increasing N, while having the property of both PEP reduction and error correction.

According to the present invention, it is provided a coding method for multicarrier signal comprising the steps of; determining, based on an input signal, a plurality of phases containing one or more kernels each consisting of first to fourth phases that satisfy a phase condition that an absolute value of a difference of a phase difference $\Delta\theta(2^k)$, between $2^{k-1}$ second phases and $2^{k-1}$ first phases, from a phase difference $\Delta\theta^*(2^k)$, between $2^{k-1}$ fourth phases and $2^{k-1}$ third phases, $|\Delta\theta(2^k)-\Delta\theta^*(2^k)|$, be equal to a given value, where k is an integer not smaller than 1; and generating a code corresponding to the signal input by assigning the plurality of phases to a plurality of carrier frequencies in such a manner as to satisfy a carrier allocation that a difference of $2^{k-1}$ carrier frequencies to which the second phases are assigned from $2^{k-1}$ carrier frequencies to which the first phases are assigned be equal to a difference of $2^{k-1}$ carrier frequencies to which the fourth phases are assigned from $2^{k-1}$ carrier frequencies to which the third phases are assigned, carrier frequencies to which the third phases are assigned having the same carrier allocation as those of the first phases.

According to the present invention, it is also provided a decoding method for the above-mentioned signal comprising the steps of: determining, based on each input signal, a plurality of phases containing one or more kernels each consisting of first to fourth phases that satisfy a phase condition that an absolute value of a difference of a phase difference $\Delta\theta(2^k)$, between $2^{k-1}$ second phases and $2^{k-1}$ first phases, from a phase difference $\Delta\theta^*(2^k)$, between $2^{k-1}$ fourth phases and $2^{k-1}$ third phases, $|\Delta\theta(2^k)-\Delta\theta^*(2^k)|$, be equal to a given value, where k is an integer not smaller than 1; generating a plurality of codes corresponding to the signal input by assigning the plurality of phases to a plurality of carrier frequenci s in such a manner as to satisfy a carrier allocation that a difference of $2^{k-1}$ carrier frequencies to which the second phases are assigned from $2^{k-1}$ carrier frequencies to which the first phases are assigned be equal to a difference of $2^{k-1}$ carrier frequencies to which the fourth phases are assigned from $2^{k-1}$ carrier frequencies to which the third phases are assigned, carrier frequencies to which the third phases are assigned having the same carrier allocation as those of the first phases; calculating a code distance between each of the plurality of codes and a received code; and decoding the received code by determining an input signal that provides a code whose code distance to the received code is the smallest.

According to the present invention, it is also provided an encoder for multicarrier signals comprising: a subset selecting unit for determining, based on an input signal, a plurality of phases containing one or more kernels each consisting of first to fourth phases that satisfy a phase condition that an absolute value of difference of a phase difference $\Delta\theta(2^k)$, between $2^{k-1}$ second phases and $2^{k-1}$ first phases, from a phase difference $\Delta\theta^*(2^k)$, between $2^{k-1}$ fourth phases and $2^{k-1}$ third phases, $|\Delta\theta(2^k)-\Delta\theta^*(2^k)|$, be equal to a given value, where k is an integer not smaller than 1, and for assigning the plurality of phases to a plurality of carrier frequencies in such a manner as to satisfy a carrier allocation that a difference of $2^{k-1}$ carrier frequencies to which the second phases are assigned from $2^{k-1}$ carrier frequencies to which the first phases are assigned be equal to a difference of $2^{k-1}$ carrier frequencies to which the fourth phases are assigned from $2^{k-1}$ carrier frequencies to which the third phases are assigned, carrier frequencies to which the third phases are assigned having the same carrier allocation as those of the first phases; and a subset mapping unit for mapping the phases assigned by the subset selecting unit to quadrature signals.

According to the present invention, it is also provided a decoder for multicarrier signals comprising: an encoding unit both for determining, based on each input signal, a plurality of phases containing one or more kernels each consisting of first to fourth phases that satisfy a phase condition that an absolute value of difference of a phase difference $\Delta\theta(2^k)$, between $2^{k-1}$ second phases and $2^{k-1}$ first phases, from a phase difference $\Delta\theta^*(2^k)$, between $2^{k-1}$ fourth phases and $2^{k-1}$ third phases, $|\Delta\theta(2^k)-\Delta\theta^*(2^k)|$, be equal to a given value, where k is an integer not smaller than 1, and for generating a plurality of codes corresponding to the signal input by assigning the plurality of phases to a plurality of carrier frequencies in such a manner as to satisfy a carrier allocation that the difference of $2^{k-1}$ carrier frequencies to which the second phases are assigned from $2^{k-1}$ carrier frequencies to which the first phases are assigned be equal to a difference of $2^{k-1}$ carrier frequencies to which the fourth phases are assigned from $2^{k-1}$ carrier frequencies to which the third phases are assigned, carrier frequencies to which the third phases are assigned having the same carrier allocation as those of the first phases; a code distance calculating unit for calculating a code distance between each of the plurality of codes and a received code; and a smallest-distance code selecting unit for decoding the received code by determining an input signal that provides a code whose code distance to the received code is the smallest.

BEST MODE FOR CARRYING OUT THE INVENTION

Figure 1:
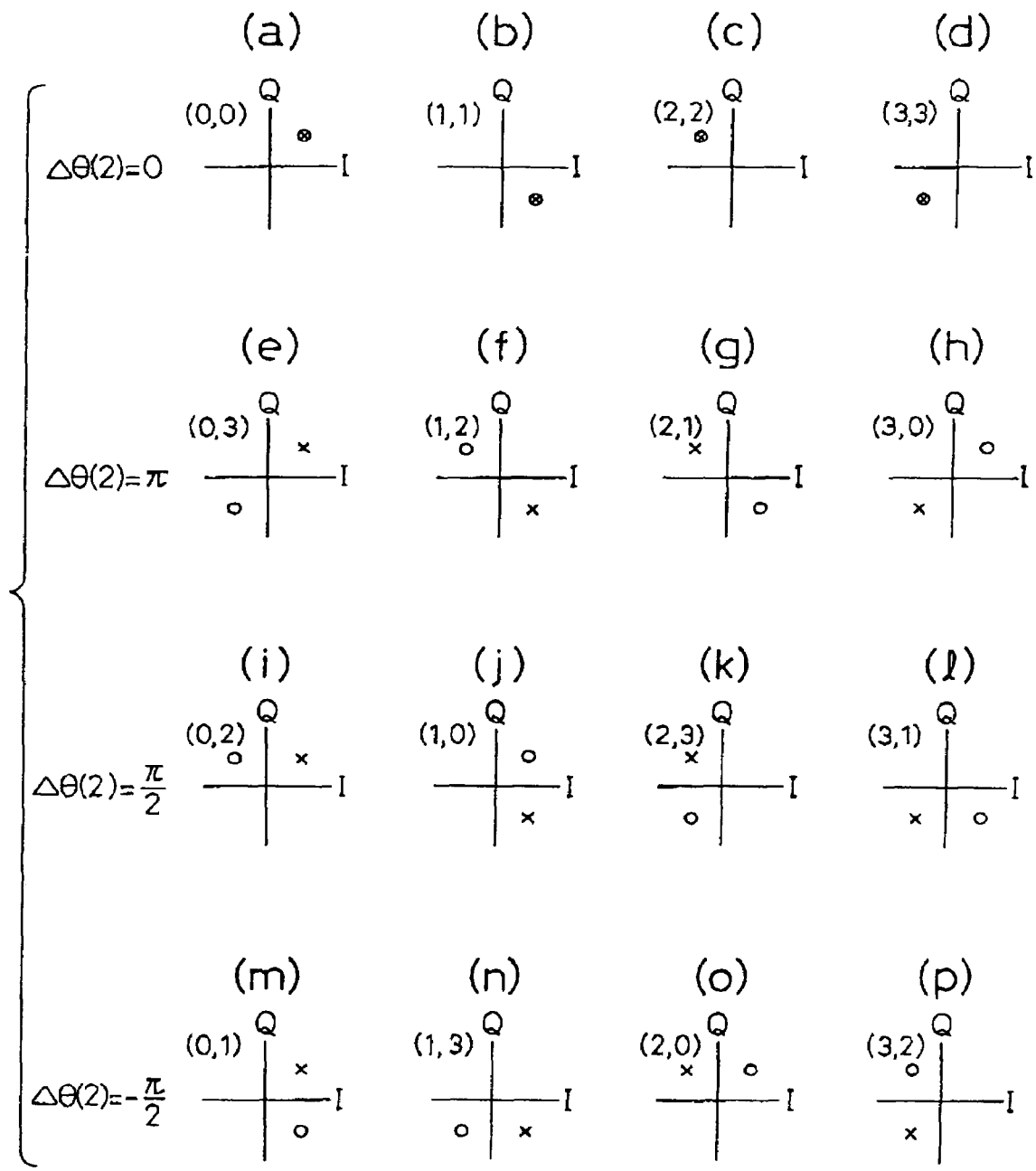
FIG. 1 is a diagram showing 16 possible signal point patterns that can be given to two carriers in the case of QPSK.

First, an example of encoding according to the present invention will be described by dealing with the case where QPSK is employed as the modulation scheme for each carrier and the number of carriers is four. FIG. 1 shows 4×4 =16 possible signal point patterns for two carriers when the modulation scheme is QPSK. When the phase difference (relative phase) between the two signal points assigned to the two carriers is designated by $\Delta\theta(2)$, then $\Delta\theta(2)$ is 0, $\pi$, $\pi/2$, and $-\pi/2$ for the patterns (a) to (d), (e) to (h), (i) to (l), and (m) to (p), respectively, in FIG. 1.

Figure 2:
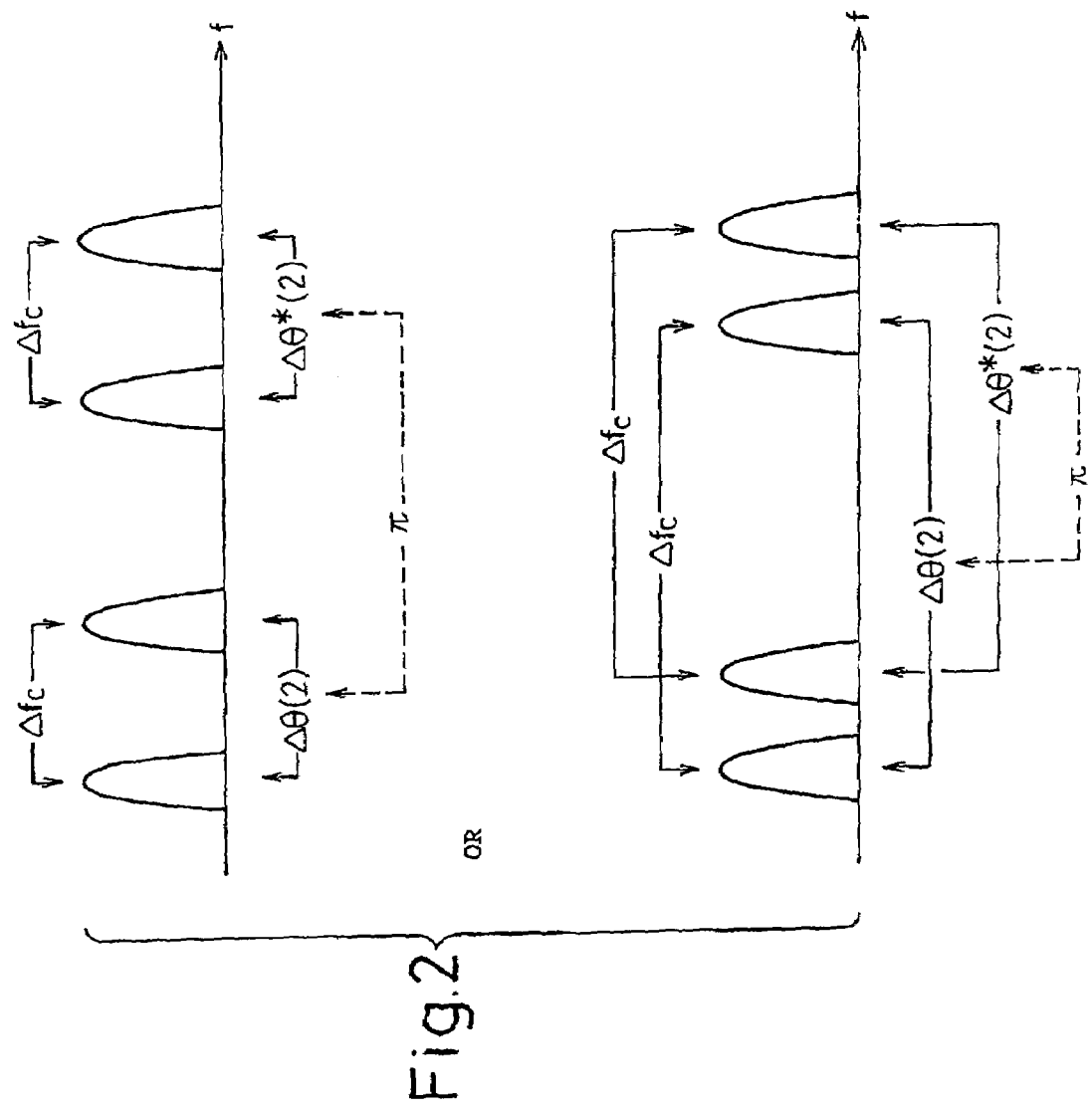
FIG. 2 is a diagram for explaining four carriers with which a PEP reduction effect of 3 dB can be obtained.

If the phases of the signal points assigned to four carriers are independent of each other, the peak envelope power (PEP) of the four carriers is four times the PEP of one carrier (that is, +6 dB). However, as shown in FIG. 2, provided that the frequency differences in respective two pairs of carriers are the same as each other, if the absolute value of a difference of the relative phase $\Delta\theta(2)$ of the signal points for a pair of carriers from the relative phase $\Delta\theta^*(2)$ of the signal points for another pair of carriers, $|\Delta\theta(2)-\Delta\theta^*(2)|$, is $\pi$, then PEP is reduced to two times that of one carrier. That is, if codes formed from four carriers are limited to those which have a 4-carrier signal pattern that satisfies the condition $$|\Delta\theta(2)-\Delta\theta^*(2)|=\pi \tag{1}$$

a PEP reduction of 3 dB can be obtained.

Such codes are constructed from a combination of two patterns, one with a 2-carrier relative phase of 0 and the other with a 2-carrier relative phase of $\pi$ (a combination of one of (a) to (d) and one of (e) to (h) in FIG. 1), or one with a 2-carrier relative phase of $\pi/2$ and the other with a 2-carrier relative phase of $-\pi/2$ (a combination of one of (i) to (l) and one of (m) to (p)). Therefore, if the input signal is encoded by mapping it to a set of codes that satisfy the above condition, a PEP reduction of 3 dB can be obtained. In the set of these codes, two codes such that the signal point only for one carrier differs and the signal points for the other three carriers are the same cannot exist, because either one of the codes always fails to satisfy the equation (1). That is, to satisfy the equation (1), signal points for two or more carriers must differ. The minimum distance $_{min}$ is therefore $$d_{min}=\sqrt{2}d \tag{2}$$

which means that the error-correction capability improves compared with the case where the signal patterns are not limited. Furthermore, since this mapping has a given logical relationship, the encoding circuit can be constructed using logic circuits instead of ROMs.

As described above, the codes that satisfy the equation (1) are classified into two groups; one is a combination of 2-carrier relative phases of 0 and $\pi$, and the other is a combination of $\pi/2$ and $-\pi/2$. Therefore, when the modulation scheme is QPSK, the number of groups, G(2), is $$G(2)=2 \tag{3}$$

Since each group consists of a combination of one of four kinds of 2-carrier signal patterns and one of another four kinds of 2-carrier signal patterns, the number of possible combinations, $K_4(2)$, is $$K_4(2)=4\times4=16 \tag{4}$$

Further, since two codes are generated from the combination of two 2-carrier signal patterns, such as two codes (0, 0, 0, 3) and (0, 3, 0, 0) generated from a combination of (0, 0) in FIG. 1(a) and (0, 3) in FIG. 1(e), the number of code patterns $P_4(1, 2)$ (in QPSK, with one kernel) is $$P_4(1, 2) = K_2(2) \times {}_{G(2)}C_1 \times 2 \tag{5}$$
$$= 2^6$$

and the encoding rate $R_4(1, 2)$ $$R_4(1, 2)=6/8=0.75 \tag{6}$$

is obtained.

In the case of QPSK, there are four 2-carrier relative phases, 0, $\pi/2$, $\pi$, and $-\pi/2$, and when the absolute value of the difference between two relative phases, $|\Delta\theta(2)-\Delta\theta^*(2)|$, is defined as $\Delta\phi(4)$, $\Delta\phi(4)$ takes one of three values, 0, $\pi/2$, or $\pi$. In the case of four carriers for which this value is $\pi/2$, a PEP reduction of 0.7 dB is obtained though it is inferior to the 3 dB obtained when the value is $\pi$. Such codes also fall within the scope of the present invention.

When the modulation scheme for each carrier is an M-ary phase shift keying modulation scheme (MP5K, $M=2^m$, $m\geq 2$), the number of possible 2-carrier relative phases $\Delta\theta(2)$ is $2^m$. From these, $2^m/2$ pairs that satisfy the equation (1) can be obtained. Hence; the number of groups G(m) that satisfy the equation (1) is $$G(m)=2^m/2=2^{m-1} \tag{7}$$

Since each group consists of one of $2^m$ kinds of 2-carrier signal patterns and another one of $2^m$ kinds of 2-carrier signal patterns, the number of possible combinations, $K_4(m)$, is $$K_4(m)=2^m\times 2^m=2^{2m} \tag{8}$$

When m=2, the equations (7) and (8) are reduced to the equations (3) and (4), respectively. As with the case of m=2, since two codes are generated from each combination of two 2-carrier signal patterns, the number of code patterns, $P_4(1, m)$, is $$P_4(1, m) = K_4(m) \times {}_{G(m)}C_1 \times 2 \tag{9}$$
$$= 2^{2m} \times 2^{m-1} \times 2$$
$$= 2^{3m}$$

and the coding rate $R_4(1, m)$ $$R_4(1, m)=3m/4m=0.75 \tag{10}$$

is obtained.

Figure 3:
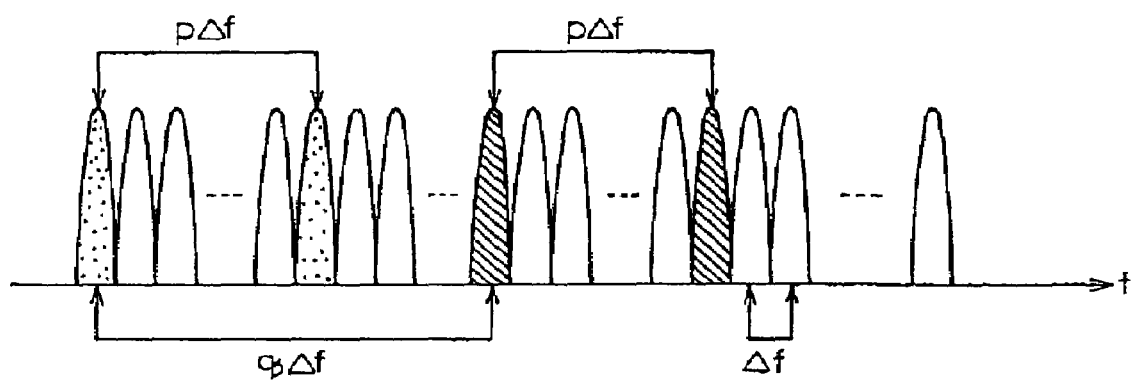
FIG. 3 is a diagram for explaining how 4-carrier kernels are assigned on the frequency axis.

In one aspect of the present invention, both the earlier described PEP reduction effect and code distance extension effect are obtained using a 4n-carrier code constructed from n kernels each consisting of a 4-carrier signal pattern that satisfies the equation (1). Here, two carrier pairs, represented by the phase differences $\Delta\theta(2)$ and $\Delta\theta^*(2)$ in the equation (1), are called two subsets which form a 4-carrier kernel. In this case, the only condition relating to the frequency is that in each kernel the carrier spacing between the two carriers (forming a subset) are the same as each other; therefore, the carriers forming each kernel can be placed anywhere on the frequency axis, provided this condition is satisfied. In other words, a code may be created by assigning each kernel to any 4-carrier block, as shown in FIG. 3, provided that the above condition is satisfied. Accordingly, as the number of kernels increases, greater freedom is given in reordering on the frequency axis. Thus the number of code patterns increases, and bringing the coding rate closer to 1.

First, a description will be given of the case of QPSK with two kernels (m=2, n=2). In this case, consider the two groups of signal patterns (one group consisting of a combination of relative phases of 0 and $\pi$ and the other consisting of a combination of relative phases of $\pi/2$ and $-\pi/2$) that can be assigned to one kernel; then, the sum of the number of code patterns $P_4(2, 1, 2)$ obtainable by assigning only either one of the groups to the two kernels and the number of code patterns $P_4(2, 2, 2)$ obtainable by assigning the two groups to the two kernels, respectively, is the total number of possible code patterns $P_4(2, 2)$.

Figure 4:
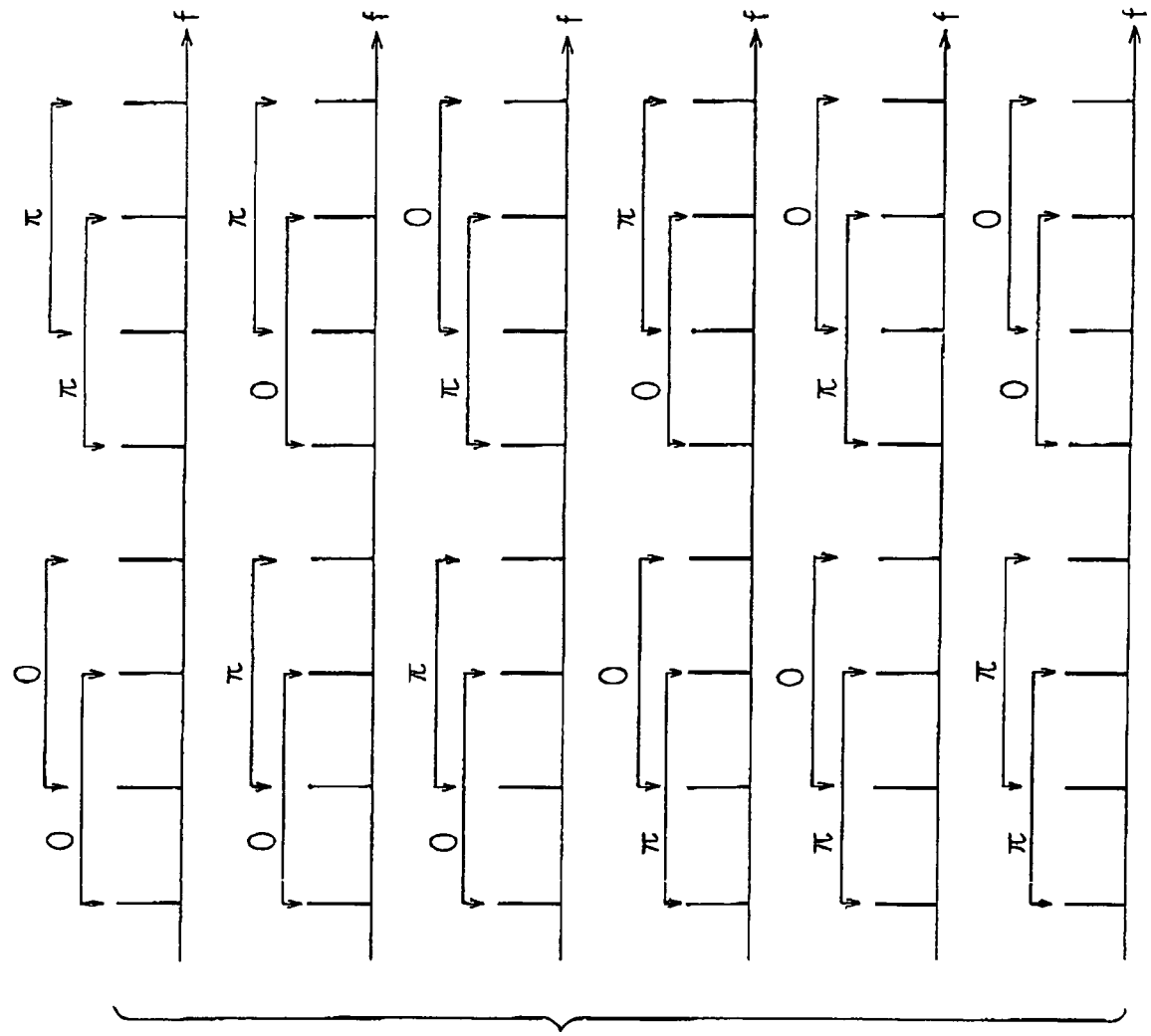
FIG. 4 is a diagram for explaining the reordering of two 4-carrier kernels on the frequency axis.

When assigning only one group consisting, for example, of a combination of relative phases of 0 and $\pi$, to the two kernels, the number of variations when reordering on the frequency axis is equal to the number of variations when assigning the two zero-relative-phase carrier pairs to two of the four positions, as shown in FIG. 4, that is, $_4C_2 = (4!)/(2!)(2!)$. Hence, the number of possible code patterns, $P_4(2, 1, 2)$, is $$P_4(2, 1, 2) = (K_4(2))^2 \times {}_{G(2)}C_1 \times 4!/2!2! \qquad (11)$$
$$= 2^{10} \times 3 = 3072$$

Besides the codes shown in FIG. 4, a code constructed from carrier pairs of two carriers of a relative phase of 0 or $\pi$, for example, adjacent to each other on the frequency axis, can be considered, but any such code becomes identical to one of the codes shown in FIG. 4. Accordingly, the following description is given by assuming that the carrier spacing between any two carriers providing the phase difference $\Delta\theta(2)$ is fixed to one predetermined value.

When assigning signal patterns belonging to different groups to the two kernels, the number of variations when reordering on the frequency axis is equal to the number of variations when assigning the four different carrier pairs, each with a relative phase of 0, $\pi$, $\pi/2$, of $-\pi/2$, to four positions, that is, it is given as 4!. Hence $$P_4(2, 2, 2) = (K_4(2))^2 \times {}_{G(2)}C_2 \times 4! \qquad (12)$$
$$= 2^{11} \times 3 = 6144$$

$P_4(2, 2)$ is $$P_4(2, 2) = 9216$$

and the coding rate $R_4(2, 2)$ $$R_4(2, 2) = \log_2 9216/16 = 0.823$$

is obtained.

In the above case, the numerator $\log_2 9216$ in the equation of the coding rate $R_4(2, 2)$ does not become an integer. Since this makes the encoding/decoding circuits very complex, it is preferable to restrict the number of codes, for example, to $2^{13} = 8192$ and encode a 13-bit signal input into eight QPSK signals. In this case, the coding rate is $^{13}/_{16} = 0.722$. Such a coding rate, when not rounding the numerator to an integer, is hereinafter called the ideal coding rate.

When m≧2 and n=2, the equations (11) and (12), respectively, become $$P_4(2, 1, m) = (K_4(m))^2 \times {}_{G(m)}C_1 \times 4!/2!2! \qquad (13)$$

$$P_4(2, 2, m) = (K_4(m))^2 \times {}_{G(m)}C_2 \times 4! \qquad (14)$$

When m≧2 and n≧2, in the case where a code is generated by assigning signal patterns belonging to i kinds of groups ($1 \leq i \leq \gamma = \min(n, G(m))$) to n kernels, when the number of kernels to which the signal patterns belonging to the j-th group is assigned ($1 \leq j \leq i$) is denoted by $n_j$ ($\geq 1$), and when defining as $n_0=1$, then the range of values that each $n_j$ can take is $$1 \leq n_j \leq n - \sum_{c=0}^{j-1}(n_c - 1) \quad (1 \leq j \leq i-1)$$

and, from the value of another $n_j$ ($1 \leq j \leq i-1$), $n_i$ is determined as $$n_1 = n - \sum_{j=1}^{i-1} n_j; \quad (i \geq 2)$$

Accordingly, when the maximum value $$n - \sum_{c=0}^{j-1}(n_c - 1)$$

that each $n_j$ can take is denoted by $N_j$ ($1 \leq j \leq i-1$), the number of possible code patterns $P_4(n, i, m)$ for the respective values of i is $$P_4(n, i, m) = \begin{cases} (K_4(m))^n \times {}_{G(m)}C_i \times \dfrac{(2n)!}{(n!)^2} & i = 1 \\ (K_4(m))^n \times {}_{G(m)}C_i \times \\ \left\{ \displaystyle\sum_{n_1=1}^{N_1} \sum_{n_2=1}^{N_2} \cdots \sum_{n_{i-1}=1}^{N_{i-1}} \left\{ \dfrac{(2n)!}{\prod_{j=1}^{i}(n_j!)^2} \right\} \right\} & i \geq 2 \end{cases} \qquad (15)$$

From the above, the total number of possible code patterns $P_4(n, m)$ is equal to the sum of code patterns $P_4(n, i, m)$ obtainable for the respective i, and is given by $$P_4(n, m) = \sum_{i=1}^{\gamma} P_4(n, i, m) \qquad (16)$$

$$\gamma = \min(n, G(m))$$

and the ideal coding rate $R_4(n, m)$ is $$R_4(n, m) = \log_2 P_4(n, m)/4mn \qquad (17)$$

which thus provides $R \geq \frac{3}{4}$.

Table 1 shows the results of the ideal coding rates calculated for various values of m and n, together with the PEP reduction and $d_{min}$. In Table 1, the modulation schemes QPSK and 8PSK are for the cases of m=2 and m=3, respectively, and N (=the number of carries)/4 is n.

TABLE 1

| MODULATION SCHEME | NUMBER OF CARRIERS | R | PEP REDUCTION [dB] | $d_{min}$ |
|---|---|---|---|---|
| QPSK | 4 | 0.750 | 3.0 | $\sqrt{2}$ d |
| QPSK | 8 | 0.823 | 3.0 | $\sqrt{2}$ d |
| QPSK | 12 | 0.860 | 3.0 | $\sqrt{2}$ d |
| QPSK | 16 | 0.883 | 3.0 | $\sqrt{2}$ d |
| QPSK | 32 | 0.927 | 3.0 | $\sqrt{2}$ d |
| 8PSK | 4 | 0.750 | 3.0 | $\sqrt{2}$ d |
| 8PSK | 8 | 0.808 | 3.0 | $\sqrt{2}$ d |
| 8PSK | 12 | 0.856 | 3.0 | $\sqrt{2}$ d |
| 8PSK | 16 | 0.867 | 3.0 | $\sqrt{2}$ d |
| 8PSK | 32 | 0.919 | 3.0 | $\sqrt{2}$ d |

As can be seen from Table 1, the code of the present invention has the property that the coding rate increases as the number of carriers increases, while having the property of both PEP reduction and error correction.

In the present invention, in order to simplify the encoder/decoder and to further improve the amount of PEP reduction, including the case where the code length is extended as will be described later, γ or less kinds of groups can be used in any combinations (for example, only two kinds of groups can be used to construct kernels), and the kinds of groups used may be restricted by other conditions (for example, of the two kinds of groups, only those having a phase difference of π/2 are used).

Figure 5:
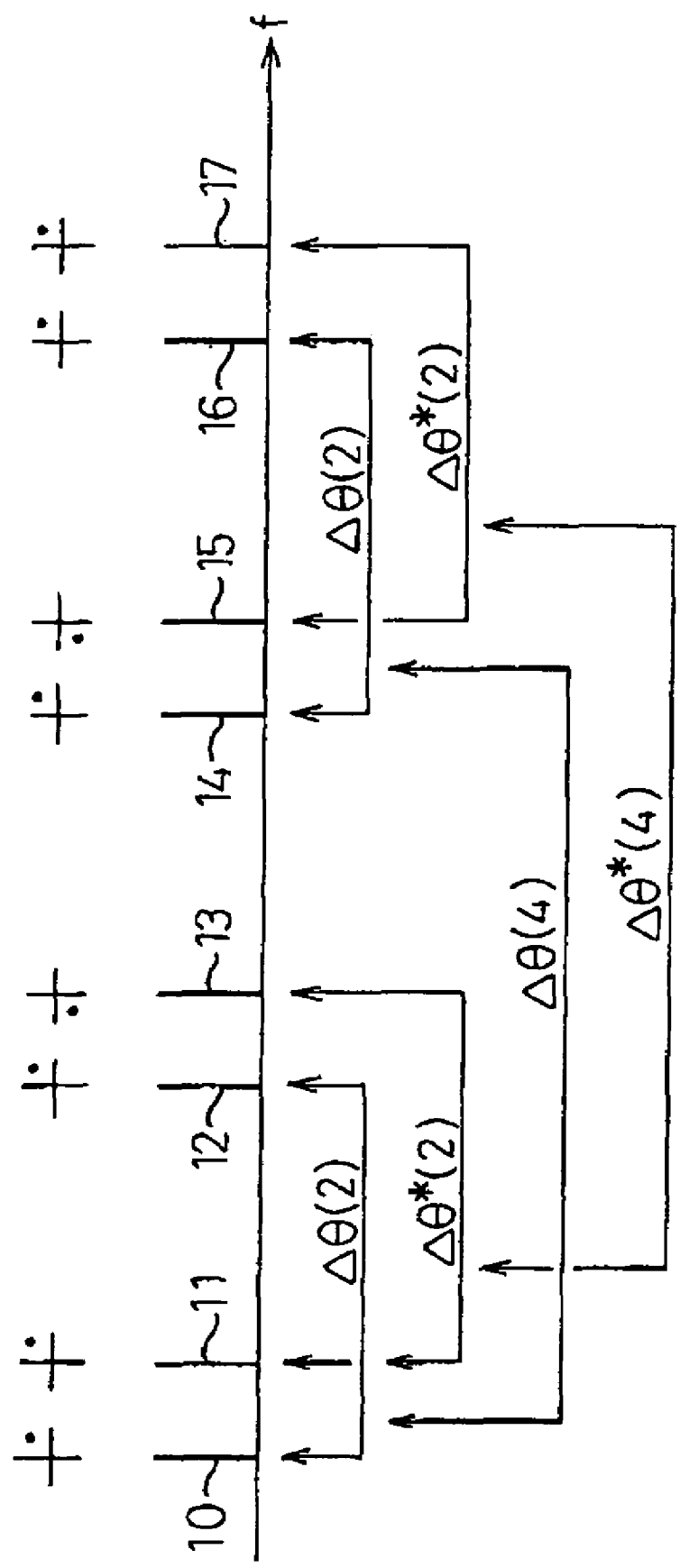
FIG. 5 is a diagram for explaining an extension from a 4-carrier kernel to an 8-carrier kernel.

FIG. 5 shows eight carriers 10 to 17 along the frequency axis, above which the positions in a two-dimensional plane of the signal points assigned to the respective carriers are shown in schematic form by way of example.

In the illustrated example, a phase difference $\Delta\theta(2)$ of 0 is provided between the carriers 10 and 12, π between the carriers 11 and 13, 0 between the carriers 14 and 16, and π between the carriers 15 and 17. That is, the carriers 10 to 13 form a 4-carrier kernel that satisfies the equation (1), and the carriers 14 to 17 also form a 4-carrier kernel that satisfies the equation (1).

Furthermore, in the illustrated example, the phase difference of the pair of carriers 10 and 12 from the pair of carriers 14 and 16, the two pairs having the same phase difference, is zero, while there is provided a phase difference of n between the pair of carriers 11 and 13 and the pair of carriers 15 and 17, another two pairs having the same phase difference. Denoting these phase differences by $\Delta\theta(4)$ and $\Delta\theta^*(4)$, respectively, as shown in the figure, the following relation holds.

$$|\Delta\theta(4)-\Delta\theta^*(4)|=\pi \quad (18)$$

Figure 24:
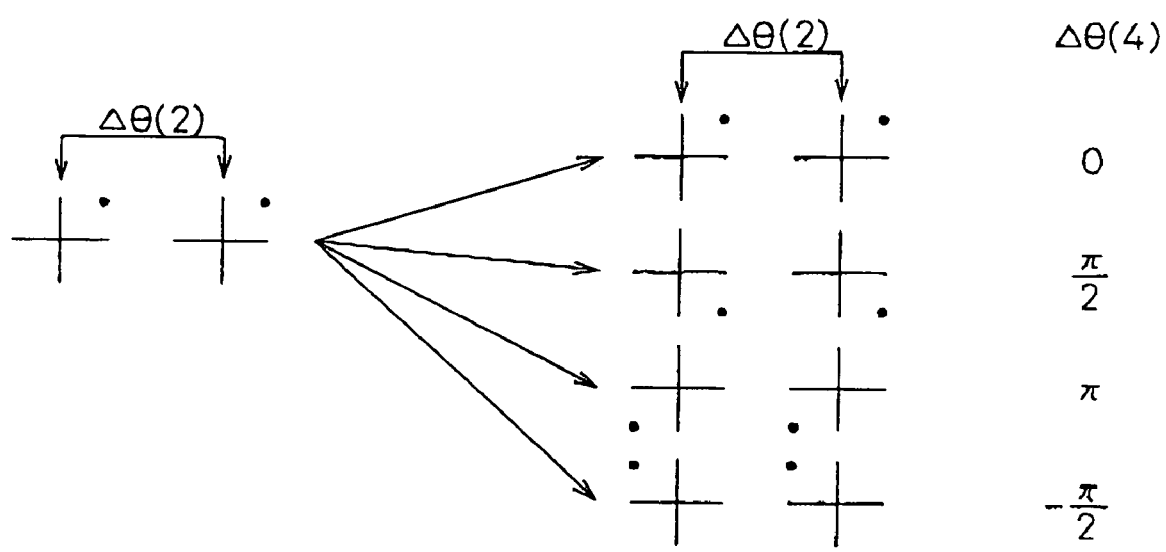
FIG. 24 is a diagram showing four possible combinations of $\Delta\theta(4)$ in QPSK.

Here, the phase difference $\Delta\theta(4)$ of the four carriers is defined by the two $\Delta\theta(2)$ carrier pairs having the same phase difference ($\Delta\theta^*(4)$ is defined similarly). In the case of FIG. 5, there are four possible combinations for the phase difference between the two $\Delta\theta(2)$ carrier pairs, as shown in FIG. 24. Therefore, in the illustrated example, $\Delta\theta(4)=0$ and $\Delta\theta^*(4)=\pi$, and hence, $\Delta\phi(8)=\pi$ holds. Further, the carrier spacing between the carriers 10 and 12 is equal to the carrier spacing between the carriers 11 and 13, while the spacing between the carriers 14 and 16 is equal to the spacing between the carriers 15 and 17; in addition, the spacing between the carriers 10 and 14 is equal to the spacing between the carriers 11 and 15. In other words, the carrier spacing between the respective carriers 10 to 13 is equal to the carrier spacing between the respective carriers 14 to 17. In this case, a 6-dB PEP reduction is obtained by adding the 3-dB PEP reduction.

That is, as in the case of constructing a 4-carrier kernel from two carrier pairs (2-carrier subsets), when an 8-carrier kernel is constructed from two 4-carrier subsets each forming a 4-carrier kernel, if the relation defined by the equation (18) holds between the two 4-carrier subsets, a 3-dB PEP reduction is obtained, provided that the carrier spacing between the respective carriers in one subset is equal to the carrier spacing between the respective carriers in the other subset. Generally, when $$\Delta\phi(2^{k+1})=|\Delta\theta(2^k)-\Delta\theta^*(2^k)| \quad (19)$$

if the relation $\Delta\phi(2^{k+1})=\pi$ holds, a kernel of code length $\kappa=2^{k+1}$, constructed from two subsets each forming a kernel of code length $\kappa=2^k$, provides the PEP reduction defined by $$\Delta P_{PEP}=(2^k, 2^{k+1})=3 \text{ dB}$$

Here, when k≥2, the phase difference $\Delta\theta(2^k)$ of $2^k$ carriers is defined by the two $\Delta\theta(2^{k-1})$ carrier pairs having the same phase difference ($\Delta\theta^*(2^k)$ is defined similarly). For the phase difference between the two $\Delta\theta(2^{k-1})$ carrier pairs, there are as many possible combinations as there are $2^m$ states, as in the case of k=1, but regardless of the value of k.

Figure 6:
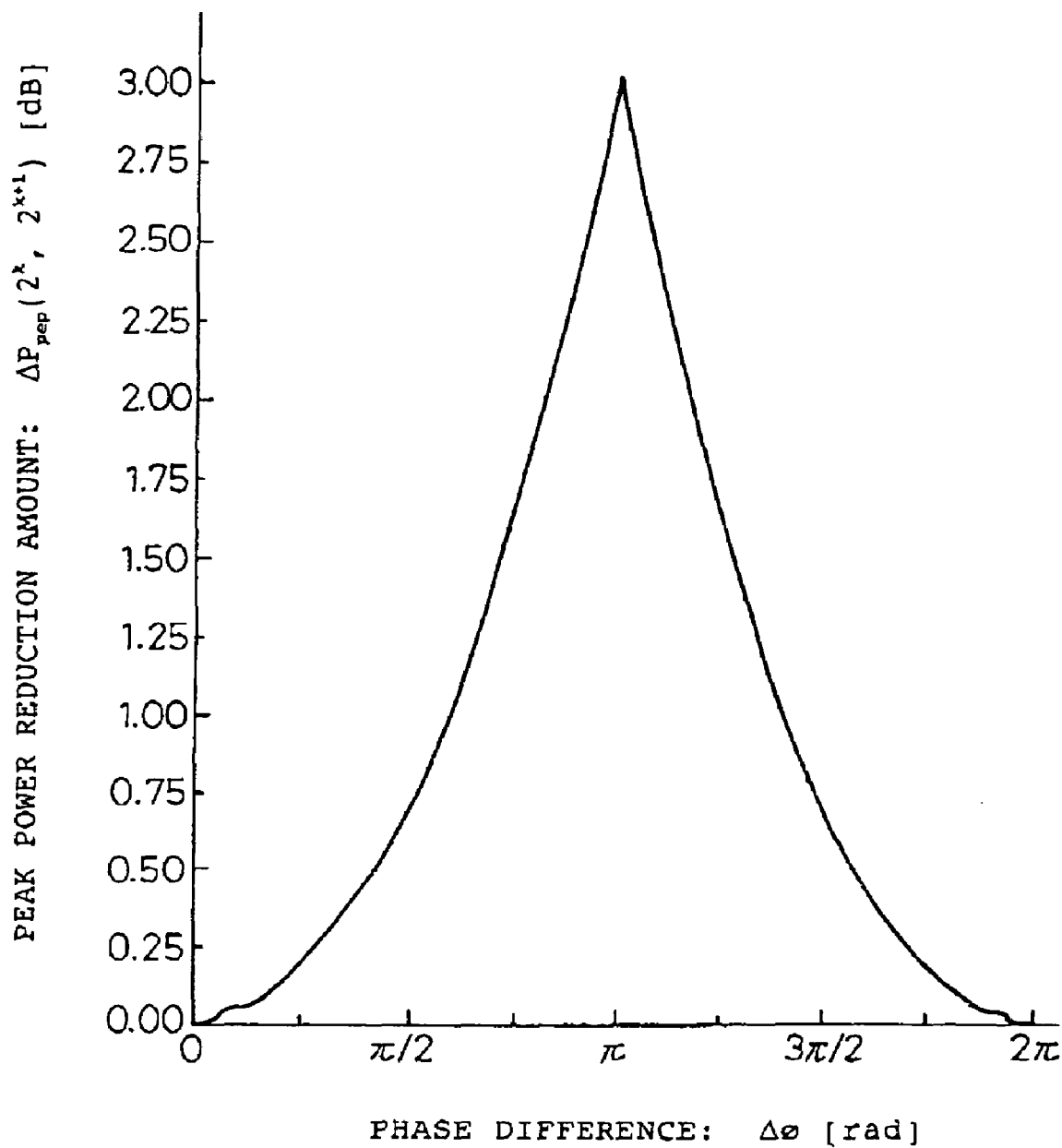
FIG. 6 is a graph showing the relationship between phase difference $\Delta\phi$ and PEP reduction amount.

As with QPSK, when the phase difference $\Delta\phi(2^{k+1})$ is a nonzero value other than π, a certain PEP reduction can be obtained though it falls short of the 3 dB achieved when the phase difference is π. FIG. 6 shows the results of calculations, plotting the PEP reduction $\Delta P_{PEP}$ $(2^k, 2^{k+1})$ as a function of the phase difference $\Delta\phi$. As shown, a PEP reduction of 3 dB is obtained when $\Delta\phi$ $(2^{k+1})$ is π, and 0.7 dB when it is π/2.

The above can be applied recursively. For any value of k, the total PEP reduction $\Delta P_{PEP}$ (κ) for the code length $\kappa=2^{k+1}$ is given by $$\Delta P_{PEP}(2^{k+1}) = \sum_{i=1}^{k} \Delta P_{PEP}(2^i, 2^{i+1})$$

For example, when $(\Delta\phi(4), \Delta\phi(8))=(\pi, \pi)$, then $\Delta P_{PEP}=6$ (in the example of FIG. 5), and when $(\Delta\phi(4), \Delta\phi(8))=\{(\pi, \pi/2), (\pi/2, \pi)\}$, then $\Delta P_{PEP}=3.7$. Further, when $\Delta\phi(*)=\pi(*=4, 8, \ldots)$, $\Delta P=3k$ [dB].

Since the minimum phase angle in $2^m$-PSK is $$\Delta\theta_{min}=\pi/2^{m-1}$$

phase differences that can be expressed in $2^m$-PSK are $$\{\pi, \pi/2, \ldots, \pi/2^{m-1}\}$$

Accordingly, in the case of BPSK (m=1), there is only one phase difference $\Delta\phi$ (*)=π, and in the case of QPSK (m=2), only two phase differences $\Delta\phi$ (*)={π, π/2} can be used. However, in these cases also, an arbitrary phase difference can be provided by giving an offset to the reference phase.

Figure 7:
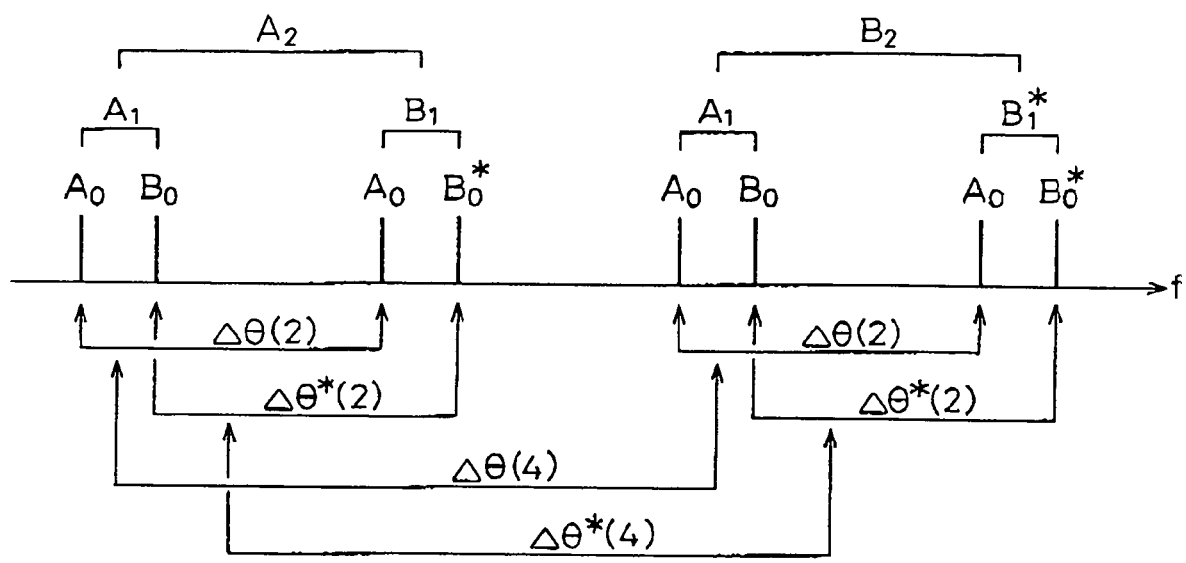
FIG. 7 is a diagram for explaining how the code length is extended.

As shown in FIG. 7, in a code of κ=8, a kernel having eight symbols is constructed from two 4-symbol subsets ($A_2$, $B_2$). At this time, when 2-symbol subsets of κ=4 are denoted ($A_1$, $B_1$), the two 4-symbol subsets ($A_2$, $B_2$) are given by $$A_2 B_2 = A_1 B_1 \cdot A_1 B_1^*$$

That is, $A_2$, which is one of the subsets forming the $\kappa=8$ kernel, is nothing but a $\kappa=4$ kernel, and the other subset $B_2$ is formed by giving a phase difference $\Delta\phi$ (8) to the 2-symbol subset $B_1$ that forms part of the $\kappa=4$ kernel.

Generally, in a code of $\kappa=2^{k+1}$, a kernel having $2^{k+1}$ symbols is constructed from two $2^k$-symbol subsets ($A_k$, $B_k$). At this time, when $2^{k-1}$-symbol subsets of $\kappa=2^k$ are denoted ($A_{k-1}$, $B_{k-1}$), the two $2^k$-symbol subsets ($A_k$, $B_k$) are given by $$A_k B_k = A_{k-1} B_{k-1} \cdot A_{k-1} B_{k-1}^* \qquad (20)$$

That is, $A_k$, which is one of the subsets forming the $\kappa=2^{k+1}$ kernel, is nothing but a $\kappa=2^k$ kernel, and the other subset $B_k$ is formed by giving a phase difference $\Delta\phi$ $(2^{k+1})$ to the $2^{k-1}$-symbol subset $B_{k-1}$ that forms part of the $\kappa=2^k$ kernel. Here, $A_0$ and $B_0$ each designate the code assigned to one carrier, and it is assumed that the phase difference $\Delta\phi$ (4) in $A_1 B_1$ is restricted to a prescribed value (for example, $\pi$). At this time, $A_k = A_{k-1} B_{k-1}$ and $B_k = A_{k-1} B_{k-1}^*$; hence, the code is extended with an arbitrary code length $\kappa=2^{k+1}$. Here, $B_{k-1}^*$ is obtained by adding the phase difference $\Delta\phi$ $(2^{k+1})$ to $B_{k-1}$. For example, when $\Delta\phi$ $(2^{k+1})=\pi$, if these are assumed to be a sequence of signal points, since the phase rotation of $\pi$ is equivalent to inverting the signal points, it follows that $$A_k B_k = A_{k-1} B_{k-1} \cdot A_{k-1} \overline{B_{k-1}} \qquad (21)$$

At this time, the number of groups (G(m)) is the same as that defined by the equation (7) when $\kappa=4$. For each pattern that the kernels of $\kappa=2^{k+1}$, the subsets forming the kernel of $\kappa=2^{k+1}$, can take, there are $2^m$ possible combinations of signal patterns that provide a phase difference of $\pi$; hence, the number of patterns ($K_{2^{k+1}}(m)$) that the kernel ($\kappa=2^{k+1}$) can take in each group is given by $$K_{2^{k+1}}(m) = 2^m \times K_{2^k}(m) \qquad (22)$$

Here, in a code constructed from n of kernels $\kappa=2^{k+1}$, PEP can be reduced by 3k [dB] with the spacing between the $2^k$-carrier subsets set at an arbitrary value. That is, the carriers can be reordered on a subset by subset basis (in blocks of $2^k$ carriers).

Since the total number of carriers is $2^{k+1}n$ instead of 4n for $\kappa=4$, and the reordering is performed in blocks of $2^k$ carriers instead of 2 carriers for $\kappa=4$, the number of reordering patterns is the same as that defined by the third term on the right-hand side of the equation (15). Further, since the kinds of groups coincide with the kinds of groups for $\kappa=4$, the number of code patterns ($P_{2^{k+1}}(n, m)$) for the code length $\kappa=2^{k+1}$ can be obtained by replacing $K_4(m)$ in the equation (15) by $K_{2^{k+1}}(m)$, that is $$P_{2^{k+1}}(n, m) = 2^{mn} \times P_{2^k}(n, m) \quad k \geq 2 \qquad (23)$$

From the above result, the ideal coding rate ($R_{2^{k+1}}(n, m)$) is uniquely given as.

$$R_{2^{k+1}}(n, m) = \frac{\log_2 P_{2^{k+1}}(n, m)}{2^{k+1} mn} \qquad (24)$$

$$= \frac{1}{2} R_{2^k}(n, m) + \frac{1}{2^{k+1}}$$

The code that generates this signal pattern has a minimum distance $\sqrt{2^k}$ times as large, that is, $d_{min} = \sqrt{2^k}$ d (d: minimum distance between signal points). This makes it possible to improve the symbol-error rate (SER) by 3k [dB] in terms of C/N (the improvement on BER is somewhat different depending on the number of modulations, m). An example is shown in Table 2.

TABLE 2

| MODULATION INDEX (m) | CODE LENGTH ($\kappa$) | R (1, m) | PEP REDUCTION [dB] | $d_{min}$ |
|---|---|---|---|---|
| 2, 3 | 4 | 0.75 | 3.0 | $\sqrt{2}$ d |
| 2, 3 | 8 | 0.5 | 6.0 | 2 d |
| 2, 3 | 16 | 0.31 | 9.0 | $\sqrt{8}$ d |
| 2, 3 | 32 | 0.19 | 12.0 | 4 d |

Figure 8:
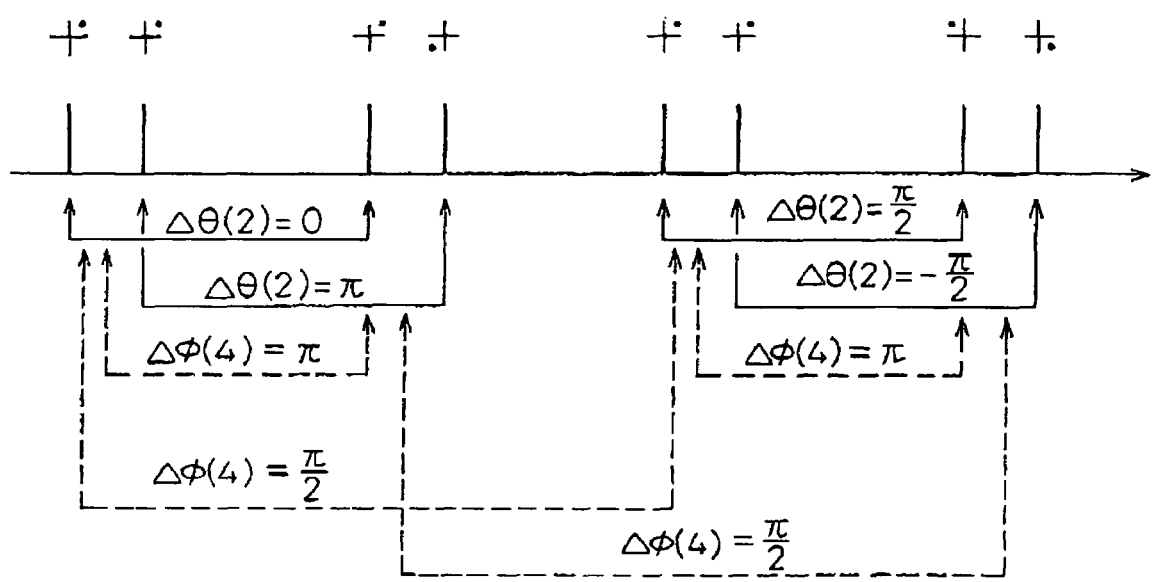
FIG. 8 is a diagram for explaining a $\kappa=4$ code that provides a PEP reduction effect of 3.7 dB.

Based on the above coding algorithm, the PEP reduction will be further increased. For example, when assigning two $\kappa=4$ kernels (n=2) to eight carriers in QPSK, if the two kernels belonging to two different groups, i.e., a $\kappa=4$ kernel whose subsets have relative phases $\Delta\theta$ of 0 and $\pi$ and a $\kappa=4$ kernel whose subsets have relative phases $\Delta\theta$ of $\pi/2$ and $-\pi/2$, are assigned as shown in FIG. 8, the 3-dB PEP reduction due to $\Delta\phi(4)=\pi$ can be obtained as already described. In FIG. 8, the signal points assigned to the respective carriers are shown above the carriers. When the combination of the carrier pair of relative phase $\Delta\theta(2)=0$ and the carrier pair of relative phase $\Delta\theta(2)=\pi/2$ is regarded as one 4-carrier kernel, and the combination of the carrier pair of relative phase $\Delta\theta(2)=\pi$ and the carrier pair of relative phase $\Delta\theta(2)=-\pi/2$ is regarded as the other 4-carrier kernel, it is seen that $\Delta\phi(4)=\pi/2$ is attained between the respective kernels. That is, the code shown in FIG. 8 represents the property having a 3-dB PEP reduction due to $\Delta\phi(4)=\pi$ and also represents the property having a 0.7-dB PEP reduction effect due to $\Delta\phi(4)=\pi/2$, and thus achieves a total PEP reduction of 3.7 dB. By assigning such a code to a plurality of kernel pairs, a PEP reduction of 3.7 dB can be obtained.

In the case of $2^m$PSK (m≥2), kernels having a phase difference of $\pi$ are classified into G(m)=$2^{m-1}$ kinds of groups, as previously described. Further, when these are restricted to the kernels where the subsets of any two kernels have a phase difference of $\pi/2$ relative to each other, the number of possible groups is $$G'(m) = G(m)/2 = 2^{m-2} \qquad (25)$$

Since a kernel pair is treated as a basic unit, n=2n' (n'≥1). At this time, each kernel pair combines the property of the phase difference $\pi$ with the property of the phase difference $\pi/2$. Therefore, the PEP reduction amount is 3+0.7=3.7 [dB]. Further, since the code of $\kappa=4$ is used, the minimum free distance is $d_{min}=\sqrt{2}$ d.

By considering in the equation (15) that i kinds of pair groups are used from the G' (m) kinds of pair groups, the number of code patterns in this code is given by $$P'_4(n, i, m) = \begin{cases} (K_4(m))^n \times {}_{G'(m)}C_i \times \frac{(2n)!}{\left(\frac{n}{2}!\right)^2} & i = 1 \\ (K_4(m))^n \times {}_{G'(m)}C_i \times \\ \left\{\sum_{n_1=1}^{N_1} \sum_{n_2=1}^{N_2} \cdots \sum_{n_{i-1}=1}^{N_{i-1}} \left\{\frac{(2n)!}{\prod_{j=1}^{i}(n_j!)^4}\right\}\right\} & i \geq 2 \end{cases} \qquad (26)$$

Here, since this is equivalent to constructing n /2 kernels using i kinds of groups (1≤i≤γ=min(n/2, G' (m))), when the number of kernels to which the j-th group is assigned ($1 \leq j \leq i$) is denoted by $n_j$ ($\geq 1$), and when $n_0=1$, then $$n_i = n/2 - \sum_{j=1}^{i-1} n_j \quad (i \geq 2),$$

and the range of values that each $n_j$ can take is $$1 \leq n_j \leq n/2 - \sum_{c=0}^{j-1} (n_c - 1) \quad (1 \leq j \leq i-1)$$

Here, $\sum_{j=1}^{i} n_j = n/2$.

As a result, when $n=2n'$, that is, when the number of kernels is even, the ideal coding rate is given by $$R'_4(n, m) = \frac{\log_2 \sum_{i=1}^{\gamma'} P_4, (n, i, m)}{4mn} \quad (27)$$
$$= \frac{\log_2 P'_4(n, m)}{4 \, mn}$$
$$\gamma' = \min\left(\frac{n}{2}, G'(m)\right)$$

Table 3 shows the results of calculations of the ideal coding rate of this code for QPSK and 8PSK, together with the values of the PEP reduction and $d_{min}$.

TABLE 3

| MODULATION INDEX (m) | CODE LENGTH (κ) | R (2, m) | PEP REDUCTION [dB] | $d_{min}$ |
|---|---|---|---|---|
| 2 | 4 | 0.79 | 3.7 | $\sqrt{2}$ d |
| 3 | 4 | 0.73 | 3.7 | $\sqrt{2}$ d |

Figure 9:
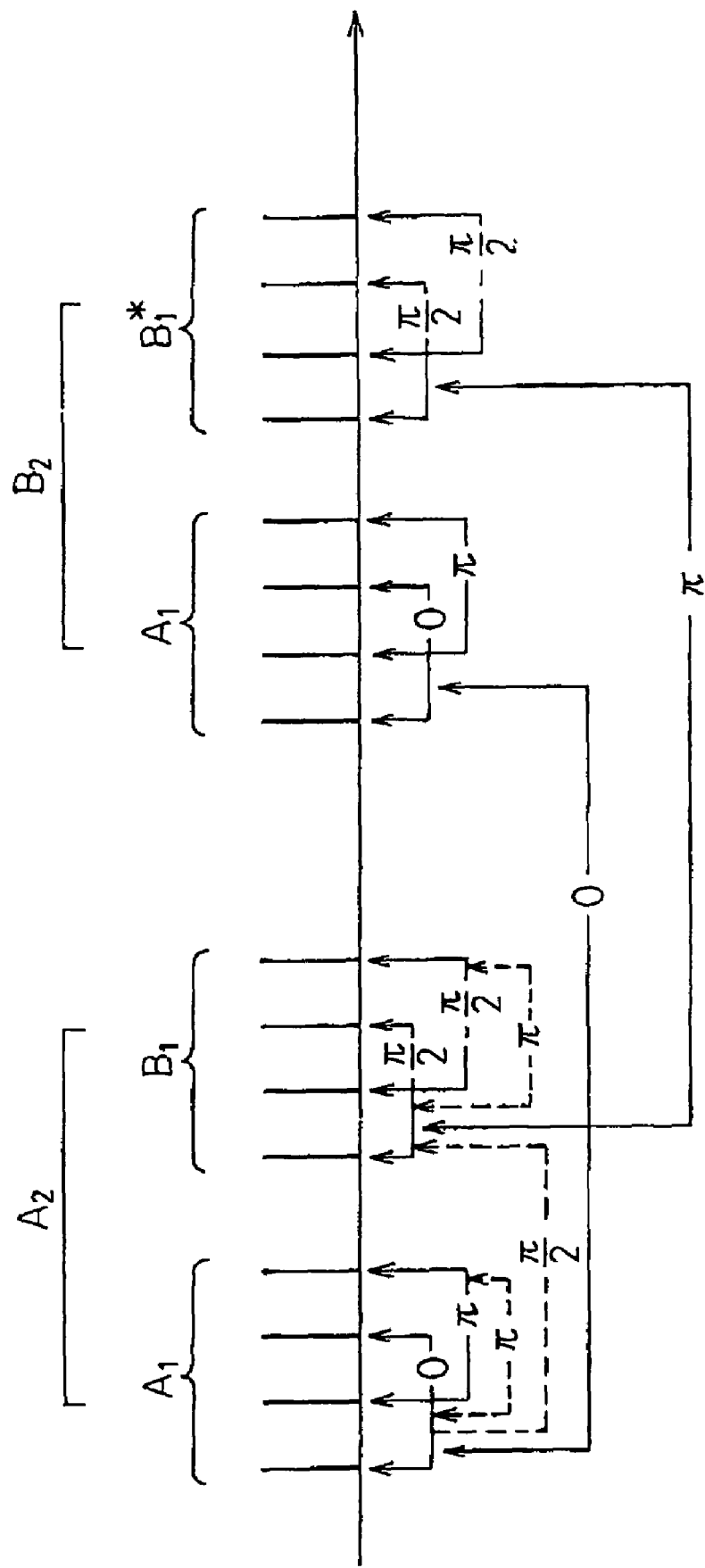
FIG. 9 is a diagram for explaining how the code length is extended using extended subsets.

Next, the 4-carrier kernel pair (FIG. 8) that provides the 3.7-dB PEP reduction is defined as a pair of extended subsets $A_1$ and $B_1$, and the code length is extended by treating the 8-carrier code pattern formed from these subsets as the basic unit. By so doing, with the code length of $\kappa=2^{k+2}$, $\Delta P_{PEP}$ ($2^{k+2}$)=3k+0.7 [dB] and $d_{min}=\sqrt{2^k}$ d are achieved. One example of such a code is shown in FIG. 9 for the case of $\kappa=2$. Here, $A_0$, $B_0$ is not defined.

In FIG. 9, the phase difference $\Delta\phi(4)$ within each of the extended subsets $A_1$ and $B_1$ is $\pi$, and the phase difference between the extended subsets $A_1$ and $B_1$ is $\pi/2$.

Figure 10:
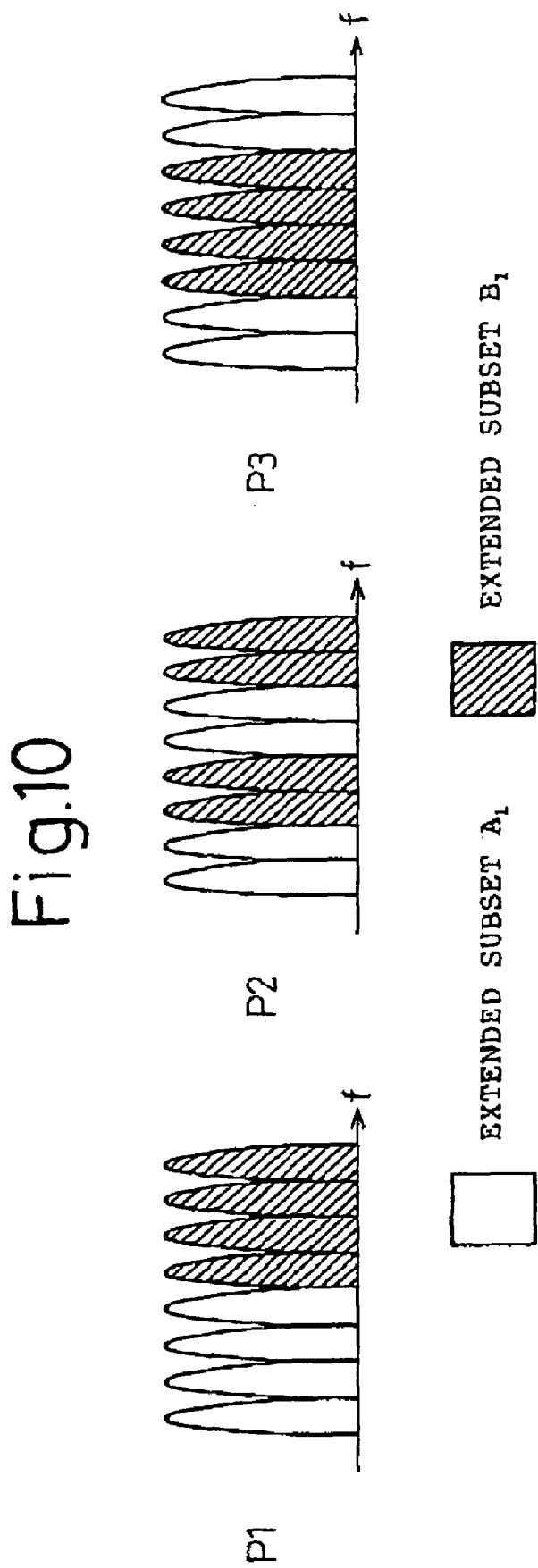
FIG. 10 is a diagram showing the classifications of groups when k=1.

In constructing a code of $\kappa=16$ using such extended subsets $A_1$ and $B_1$, when the phase difference $\Delta\theta(8)$ between one extended subset $A_1$ and another extended subset $A_1$ and the phase difference $\Delta\theta^*(8)$ between one extended subset $B_1$ and another extended subset $B_1^*$ are set to satisfy the relation $\Delta\phi(16)=\pi$, $\Delta P=6.7$ dB and $d_{min}=2d$ can be achieved.

when the kinds of groups that the extended subsets can take are denoted as $G=(G_1, G_2)$, then $(A_1, B_1)=(G_1, G_2)$ or $(G_2, G_1)$. Further, this code is classified into three types (P1, P2, and P3), as shown in FIG. 10, according to the arrangement on the frequency axis.

The extension of this code is expressed as $$A_2 B_2 = A_1 B_1 \cdot A_1 B_1^*$$

A further extension is expressed as $$A_k B_k = A_{k-1} B_{k-1} \cdot A_{k-1} B_{k-1}^* \quad (28)$$

which is the same as the equation (20), except that, while the equation (20) was applicable for $k \geq 1$, in the extension of this code the equation (28) is applicable for $k \geq 2$ since $A_0$, $B_0$ is not defined. By performing such an extension, $\Delta P_{PEP}$ ($2^{k+2}$)=3k+0.7 [dB] and $d_{min}=\sqrt{2^k}$ d are achieved in a code of $\kappa=2^{k+2}$ ($k \geq 1$).

As distinguished from subsets generated starting from 2-carrier subsets $A_0$ and $B_0$, the subsets $A_k$ and $B_k$ generated starting from the extended subsets $A_1$ and $B_1$ are also called extended subsets.

Figure 11:
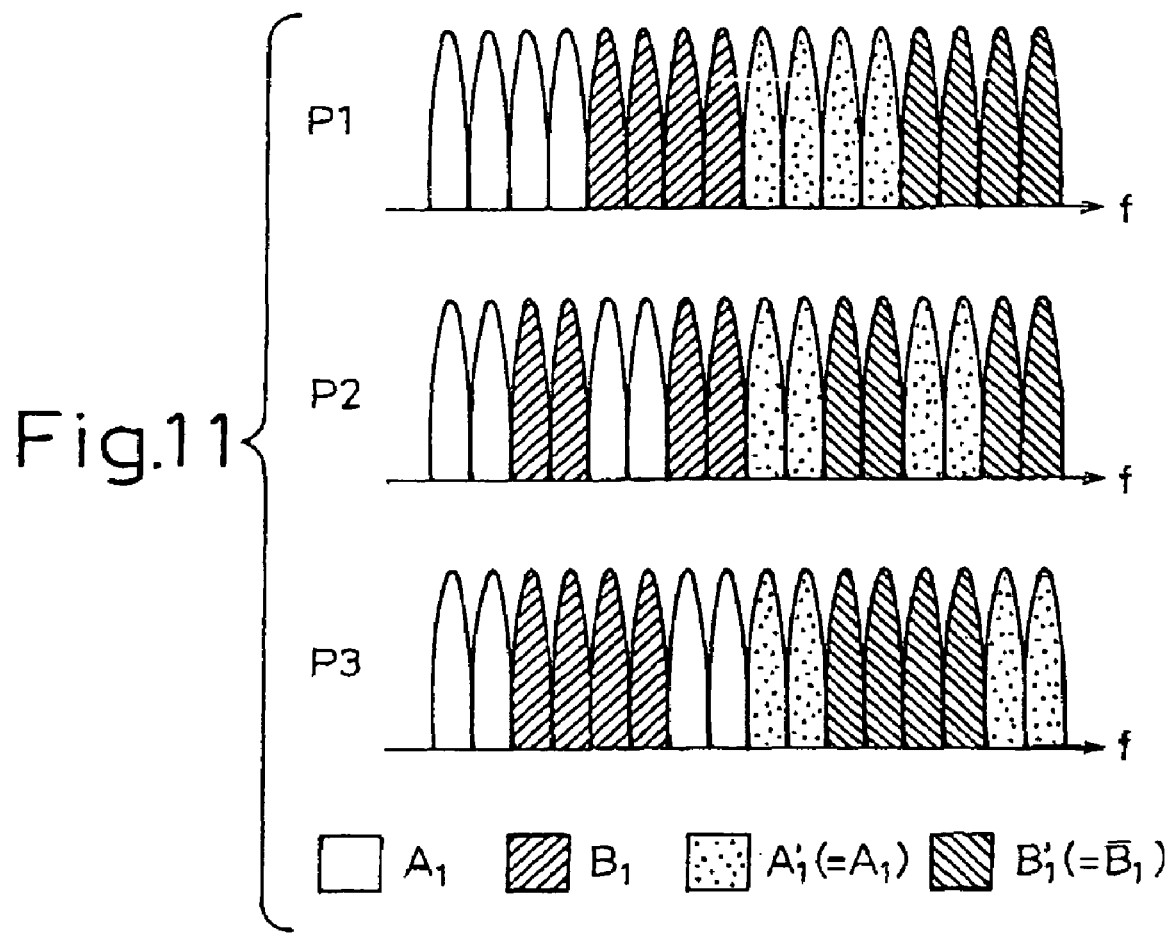
FIG. 11 is a diagram showing the classifications of groups when k=2.
Figure 12:
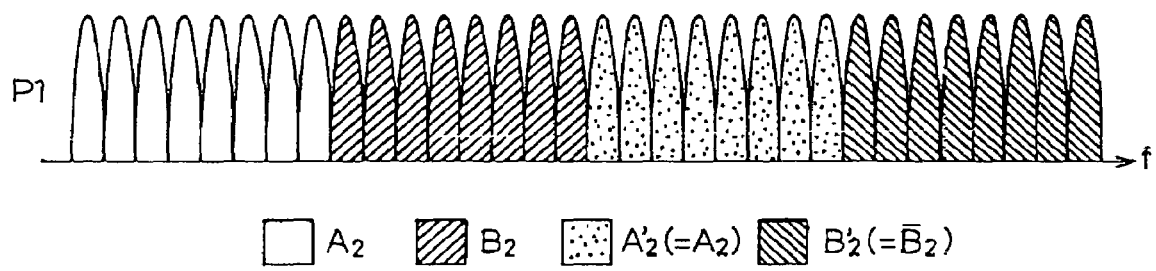
FIG. 12 is a diagram showing the classifications of groups when k=3.
Figure 13:
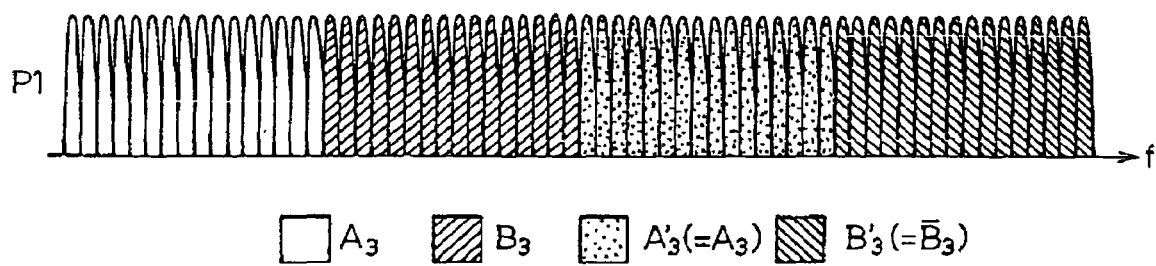
FIG. 13 is a diagram showing the classifications of groups when k=4.

In FIG. 11, that is, when k=2, since the code extension is performed based on the three types (P1, P2, and P3) shown in FIG. 10, the carrier position where the phase difference is added differs from type to type. On the other hand, when $k \geq 3$, as shown in FIGS. 12 and 13, only P1 is used.

Further, when $k \geq 2$, the kernel of $2^{k+2}$ carriers can be reordered not based on $2^{k+1}$-carrier extended subsets ($A_k$, $B_k$), but based on $2^k$-carrier extended subsets ($A_{k-1}$, $B_{k-1}$); this serves to increase the number of code patterns. At this time, $2^k$-extended subsets corresponding to the three respective types are reordered. As shown in Table 4, there are four possible reordering patterns for each type (this increases the number of code patterns by two bits). Symbols shown in the table designate the four $2^k$-carrier extended subsets forming the kernel of $\kappa=2^{k+2}$, that is, (A, B, A', B')=($A_{k-1}$, $B_{k-1}$, $A_{k-1}$, $\overline{B_{k-1}}$).

TABLE 4

Reordering patterns of extended subsets according to the type

| P1 | P2 | P3 |
|---|---|---|
| A', A, B', B | A', A, B', B | A', B', B, A |
| A', B', A, B | A', B', A, B | A', B', A, B |
| B', B, A', A | B', B, A', A | B', A', A, B |
| B', A', B, A | B', A', B, A | B', A', B, A |

(a) When $\kappa = 8$ (k = 1)

From the above, the coding rate, $R'_\theta(n, m)$, of the basic sequence of this code is given based on the equation (26). Since the kernels in the basic sequence each contain one of the two kinds of extended subsets forming $\pi/2$-pairs, this corresponds to the case of n=2 and i=1, and the method of pair group selection is not considered in the generation of the kernels. Accordingly, the number of resulting code patterns is obtained by dividing $P'_4$ (2, 1, m) by the number of combinations of pair group selections, that is, $$P'_4(2, 1, m)/_{G'(m)}C_1 = (K_4(m))^n \times \{(2 \times 2)!/(1!)^2(1!)^2\} = 2^{4m} \times 4! \quad (29)$$

when duplications arising from the reordering of the extended subsets are considered, the number of patterns ($K'_8(m)$) that the 8-carrier kernel can take is one half the number of code patterns given above, and is therefore given by $$K'_8(m) = \frac{\frac{P'_4(2, 1, m)}{G'(m)C_i}}{2} \quad (30)$$
$$= 2^{4m-1} \times 4!$$

As for the number of patterns in the case of kernel reordering, when $\kappa=8$ and $N=\kappa n$, and when n kernels are constructed using i kinds of groups ($1 \leq i \leq \gamma' = \min(n, G'(m))$), the number of patterns is the same as that for the 4-carrier code described above. That is, since the basic unit of the code length is doubled (from 4 to 8), the reordering can be thought of as reordering on an extended subset by extended subset basis, and this can be regarded as selecting i kinds of groups from $G'(m)$ kinds of groups. Hence, the number of code patterns $P'_8(n, i, m)$ in this code is $$P'_8(n, i, m) = \begin{cases} (K'_8(m))^n \times_{G'(m)} C_i \times \dfrac{(2n)!}{(n!)^2} & i = 1 \\ (K'_8(m))^n \times_{G'(m)} C_i \times \\ \left\{ \displaystyle\sum_{n_1=1}^{N_1} \sum_{n_2=1}^{N_2} \cdots \sum_{n_{i-1}=1}^{N_{i-1}} \left\{ \dfrac{(2n)!}{\prod_{j=1}^{i}(n_j!)^2} \right\} \right\} & i \geq 2 \end{cases} \quad (31)$$

From the above, the total number of code patterns, $P'_8(n, m)$, is given by $$P'_8(n, m) = \sum_{i=1}^{\gamma'} P'_8(n, i, m) \quad (32)$$

and the ideal coding rate $R'_8(n, m)$ is $$R'_8(n, m) = \log_2 P'_8(n, m)/8mn \quad (34)$$

(b) When $\kappa = 2^{k+2}$ ($k \geq 2$)

The method of extension of this code is the same as the extension of the 4-carrier code described above. However, from the above, when duplications arising from the reordering in each group are considered, since the reordering of four kinds of extended subsets is possible for any value of k ($k \geq 2$), the number of patterns ($K_{2^{k+2}}(m)$) that the kernel ($\kappa = 2^{k+2}$) can take is given by $$K_{2^{k+2}}(m) = 4 \times (2^m)^{k-1} \times K'_8(m) = 2^{m(k-1)+2} \times K'_8(m) \quad (35)$$

This provides the code pattern ($P'_{2^{k+2}}(n, m)$) with the code length of $2^{k+2}$, and hence $$P'_{2^{k+2}}(n, m) = 2^{n(m(k-1)+2)} \times P'_8(n, m) \quad (36)$$

From the above result, the ideal coding rate ($R'_{2^{k+2}}(n, mn)$) ($k \geq 2$)) is uniquely given by $$R'_{2^{k-2}}(n, m) = \dfrac{\log_2 P'_{2^{k-2}}(n, m)}{2^{k+2}mn} \quad (37)$$
$$= \dfrac{1}{2^{k-1}} R'_8(n, m) + \dfrac{m(k-1)+2}{2^{k+2}m}$$

Table 5 shows the results of calculations of the coding rate, together with the values of the PEP reduction and $d_{min}$.

TABLE 5

| MODULATION INDEX (m) | CODE LENGTH ($\kappa$) | R (1, m) | PEP REDUCTION [dB] | $d_{min}$ |
|---|---|---|---|---|
| 2 | 8 | 0.79 | 3.7 | $\sqrt{2}$ d |
|  | 16 | 0.52 | 6.7 | 2 d |
|  | 32 | 0.29 | 9.7 | $\sqrt{8}$ d |

TABLE 5-continued

| MODULATION INDEX (m) | CODE LENGTH ($\kappa$) | R (1, m) | PEP REDUCTION [dB] | $d_{min}$ |
|---|---|---|---|---|
| 3 | 8 | 0.73 | 3.7 | $\sqrt{2}$ d |
|  | 16 | 0.47 | 6.7 | 2 d |
|  | 32 | 0.27 | 9.7 | $\sqrt{8}$ d |

Figure 14:
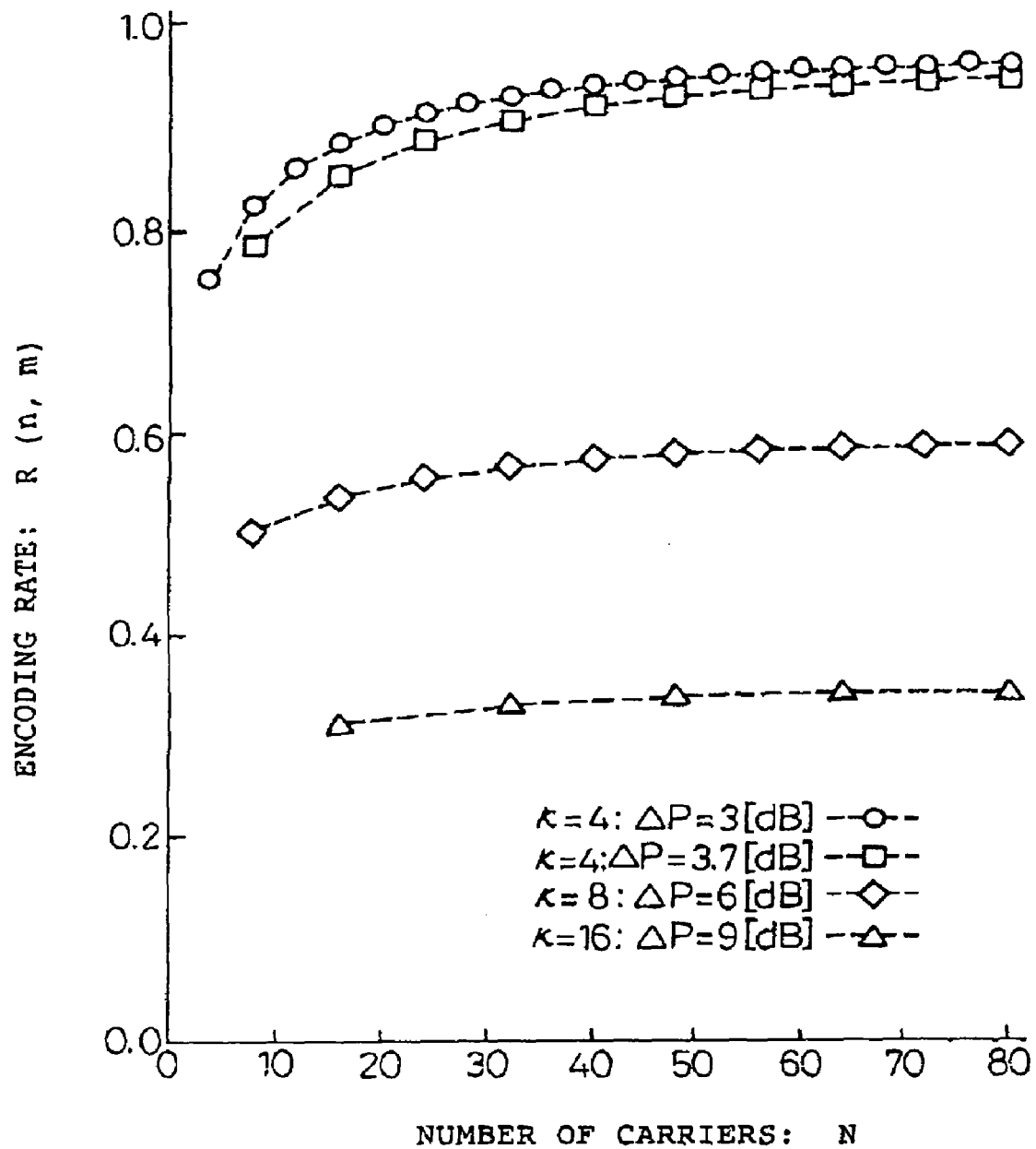
FIG. 14 is a graph showing the relationship between the number of carriers and the encoding rate.
Figure 15:
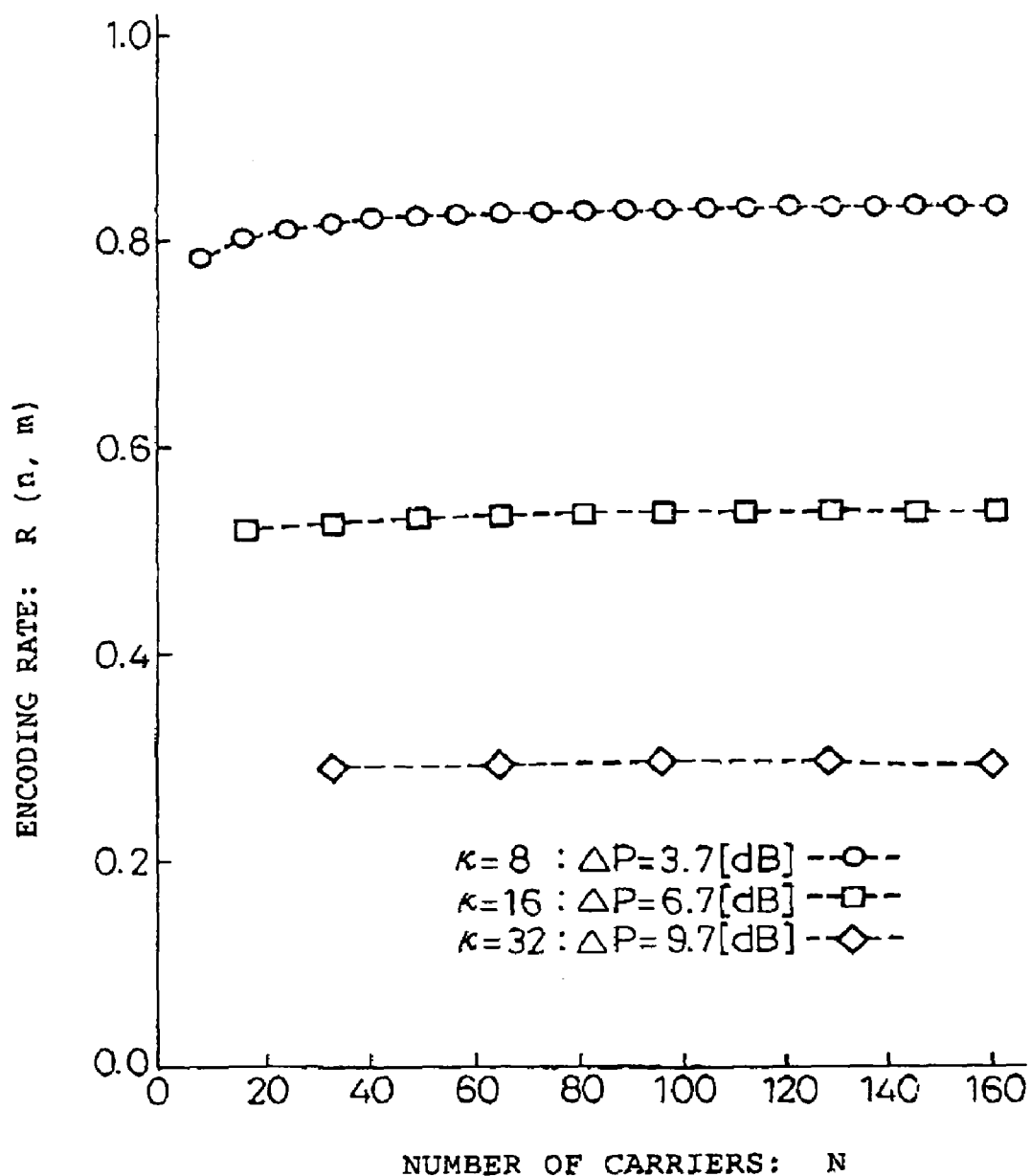
FIG. 15 is a graph showing the relationship between the number of carriers and the encoding rate.

FIG. 14 shows the relationship between the number of carriers, N, and the coding rate, for the code of Table 2 that provides PEP reduction 3k [dB] and $d_{min} = \sqrt{2^k}$ d with the code length $\kappa = 2^{k+1}$ and the code of Table 3 that provides PEP reduction 3.7 [dB] and $d_{min} = \sqrt{2}$ d with the code length $\kappa = 4$. FIG. 15 shows the relationship between the number of carriers, N, and the coding rate, for the code of Table 5 that provides PEP reduction 3k+0.7 [dB] and $d_{min} = \sqrt{2^k}$ d with the code length $\kappa = 2^{k+2}$.

When the code of Table 3 is compared with the code of Table 5 with $\kappa = 8$, it can be seen that when the number of carriers N=8, the coding rate, PEP reduction, and $d_{min}$ are the same between the two codes because both codes provide the same code. However, as can be seen from a comparison between "□" in FIG. 14 and "○" in FIG. 15, the coding rate in FIG. 14 becomes higher as the number of carriers, N, increases. This is because the former allows reordering on a subset-by-subset basis (in blocks of 2 carries) whereas, in the latter case, reordering is performed on an extended subset by extended subset basis (in blocks of 4 carriers) resulting in less freedom in reordering. However, the latter code has the advantage that the code length can be extended achieving $\Delta P_{PEP}$ ($2^{k+2}$)=3k+0.7 [dB] with $\kappa = 2^{k+2}$.

The numerator $\log_2 P_\kappa(n, m)$ of the ideal coding rate of the present invention does not necessarily become an integer. This indicates that, in digital signal processing based on binary number, it is not possible to express values without providing redundancy; if this was to be achieved, the encoder and decoder would become very complex in configuration, and the amount of hardware would increase. Accordingly, by using the value ($\lfloor \log_2 P_\kappa(n, m) \rfloor$) obtained by dropping the fractional portion of $\log_2 P_\kappa(n, m)$, any information bit is made to correspond to a code bit. At this time, for the code length $\kappa$, the coding rate ($R^*_\kappa(n, m)$) is given by $$R^*_\kappa(n, m) = \lfloor \log_2 P_\kappa(n, m) \rfloor / \kappa mn = C/D \quad (38)$$

This is achieved by restricting the total number of combinations to $2^c$, for example, when determining n kernels that satisfy $\Delta\phi(*) = \pi(* = 4, 8, \ldots, \kappa)$ and generating a transmit sequence for N=$\kappa$n carriers. That is, at this time, the code data (c(i)) generated by information data i ($0 \leq i \leq 2^c - 1$) are mapped to a sequence of n kernels expressed with one symbol duration of $\kappa$n carriers, that is, a sequence of corresponding Kn transmit signal points $$\bar{s}(c(i)) = \{\bar{s}_1(c(i)), \bar{s}_2(c(i)), \ldots, \bar{s}_{\kappa n}(c(i))\} \in \bar{S}$$

Here, when M=$2^m$ signal points in MPSK are denoted $\bar{q}_i$ ($1 \leq i \leq M$; $\in \bar{Q}$), then $\bar{S} \in \bar{Q}$. Similar coding is applied to all other codes.

Figure 16:
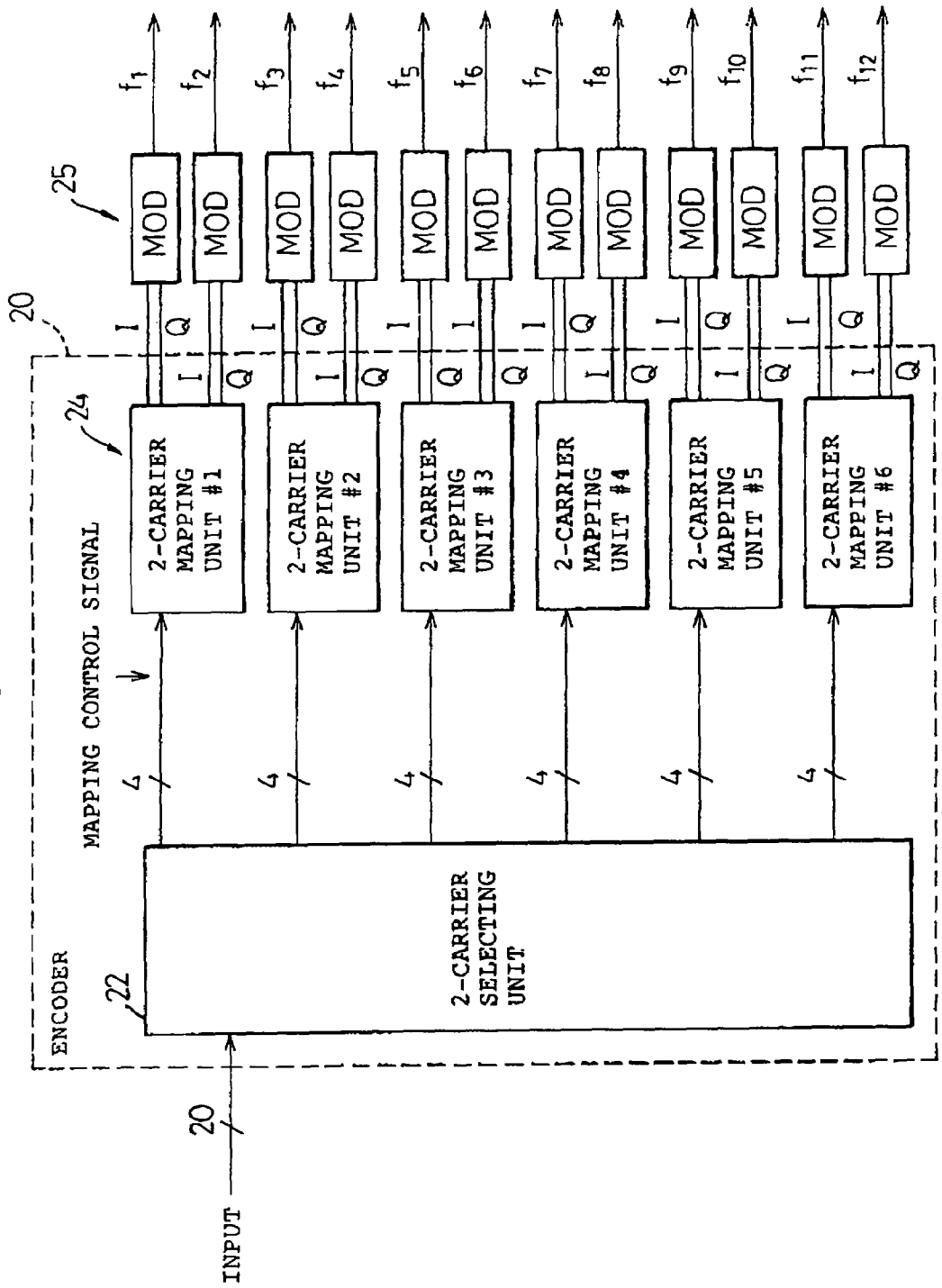
FIG. 16 is a block diagram showing one example of an encoder according to one embodiment of the present invention.

FIG. 16 shows the configuration of an encoder in a system with m=2 (QPSK), code length $\kappa = 4$ (k=1), and number of kernels n=3 (number of carriers N=$\kappa$n=12), according to one embodiment of the present invention. In this system, the number of bits of the code is m×$\kappa$×n=24 bits. On the other hand, the value of the equation (16) is 1,638,400, and the numerator of the equation (17) is 20.643 . . . , which is rounded down to the nearest integer 20. That is, encoding is performed using $2^{20}$ codes out of the 1,638,400 24-bit codes in which all the three 4-carrier kernels provide $\Delta\phi(4)=\pi$. The encoding rate is 20/24.

A 2-carrier selecting unit 22, in accordance with the 20-bit input signal, selects combinations of signal points that satisfy $\Delta\phi(4)=\pi$ from among the 16 combinations shown in FIG. 1, assigns the selected combinations of signal points to the six subsets each consisting of two carriers, and outputs mapping control signals indicating the assigned combinations of signal points. Since each subset consists of two carriers, and the signal point assigned to each carrier is identified with two bits (m=2), the 2-carrier selecting unit 22 outputs a 4-bit mapping control signal for each subset.

In each 2-carrier mapping unit 24, mapping to signal points is performed in accordance with the mapping control signal input to it. More specifically, when mapping to (0, 0) shown in FIG. 1(*a*) is specified, the I phase and Q phase of the two carriers are all set to the high level (for example, +1) for output, while when mapping to (1, 1) shown in FIG. 1(*b*) is specified, the I phase of the two carriers is set to the high level (for example, +1), and the Q phase to the low level (for example, −1), for output.

The frequencies $f_1$ to $f_{12}$ of 12 quadrature modulators 25 are, for example, equally spaced apart; at least, the carrier allocations between $f_1$ and $f_2$, $f_3$ and $f_4$, $f_5$ and $f_6$, $f_7$ and $f_8$, $f_9$ and $f_{10}$, and $f_{11}$ and $f_{12}$ are equal to each other.

Each 2-carrier mapping unit 24 is a circuit that maps four bits of input one for one to four bits of output, and can therefore be easily implemented using a simple combination logic circuit. The 2-carrier selecting unit 22 can be easily implemented using a ROM. Since there is a logical between the input and output, as described above, it is also possible to implement it using a combinational logic circuit.

Figure 17:
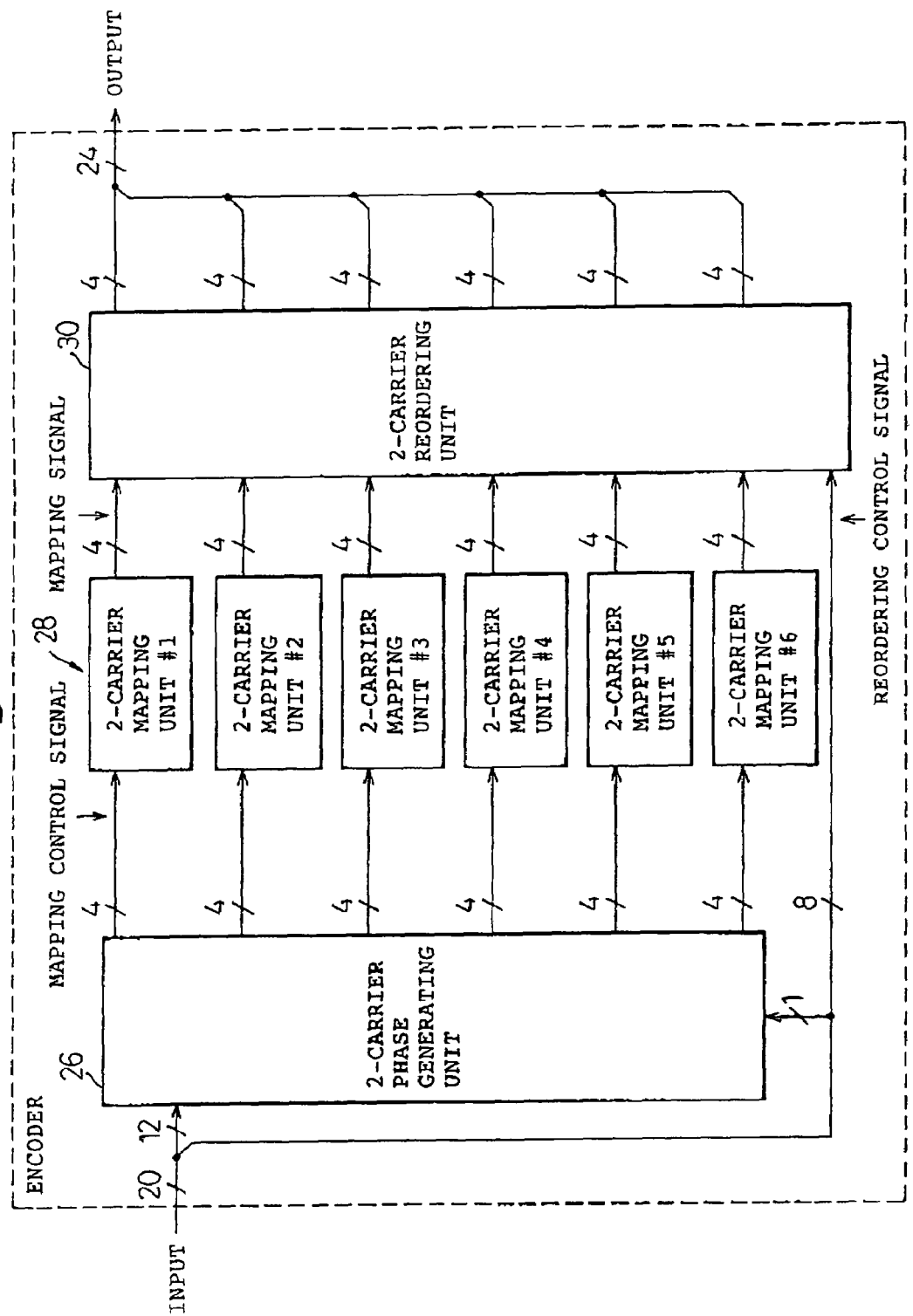
FIG. 17 is a block diagram showing a modification of the encoder of FIG. 16.

FIG. 17 shows a modification of the encoder of FIG. 16. As with the circuit of FIG. 16, m=2, n=3, and κ=4 (k=1). A 2-carrier phase generating unit 26 determines the combinations of phases given to the carriers, and a 2-carrier reordering unit 30 reorders the carriers in blocks of two carriers on the frequency axis.

In this system, the number, G(m), of groups of kernels that satisfy $\Delta\phi(4)=\pi$ is two. More specifically, there are two kinds of kernels, one being a 4-carrier kernel in which the phase differences $\Delta\theta(2)$ between two carriers are 0 and $\pi$, and the other a 4-carrier kernel in which the phase differences $\Delta\theta(2)$ between two carriers are $\pi/2$ and $-\pi/2$. Once the kind of kernel to be used is determined, the number of possible signal point combinations to be given to each carrier pair is given as 4×4=16 (see FIG. 1)

In the case of three kernels, therefore, once the kinds of kernels to be assigned to the respective kernels are determined, the number of possible signal point (phase) combinations to be given to the kernels are given as $16^3=2^{12}$ Accordingly, when the kind of kernel to be used for each of the three kernels is determined, each of the signal point combinations to be given to them is identified with 12 bits.

When all the three kernels are constructed using only one of the two kinds of groups, the number of variations when reordering in the 2-carrier reordering unit 30 is equal to the number variations when assigning the three carrier pairs to three of the six positions; hence

6!/3!3!=20

If they are constructed using only the other kind of group, the number is also given by

6!/3!3!=20

If one kernel is constructed using one kind of group ($\Delta\theta(2)=$ 0, $\pi$) and the other two kernels are constructed using the other kind of group ($\Delta\theta(2)=\pi/2$, $-\pi/2$), the number of variations when reordering is equal to the number variations when assigning one carrier pair of $\Delta\theta(2)=0$, $\pi$ and two carrier pairs of $\Delta\theta(2)=\pi/2$, $-\pi/2$ to six positions; hence

6!/2!2!=180

Likewise, if two kernels are constructed using one kind of group ($\Delta\theta(2)=0$, $\pi$) and one kernel is constructed using the other kind of group ($\Delta\theta(2)=\pi/2$, $-\pi/2$), the number of variations when reordering is

6!/2!2!180

Since $2^8<20+20+180+180<2^9$, by restricting the number of kinds of groups used and the number of variations when reordering to $2^8$, $2^{12}\times2^8$ kinds of codes can be obtained, and thus 20 bits of input can be encoded.

Further, since $2^8<180+180$, if the codes are restricted to those constructed using the two kinds of groups, not using those constructed using only one kind of group for the three kernels, 20 bits of input can be encoded. Whether one kind of group is used for only one of the three kernels or for two of the three kernels can be specified using one bit.

From the above, in FIG. 17, the 20 bits of input are divided between 12 bits for determining the combinations of carrier phases and 8 bits for reordering. Of these 8 bits, one bit (for example, the most significant bit) is also used to determine whether the one kind of group is used for one kernel or for two kernels.

More specifically, of the 8 bits, one bit is input to the 2-carrier phase generating unit 26, and this bit determines the number of groups. Then, the combinations of phases to be given to the six 2-carrier subsets are determined in accordance with the 12-bit input. The 2-carrier mapping units 28 are identical to the 2-carrier mapping units 24 in FIG. 16. Their outputs are reordered along the frequency axis in the 2-carrier reordering unit 30 in accordance with the 8-bit input.

The 2-carrier phase generating unit 26 and the 2-carrier reordering unit 30 can be easily implemented using a combinational logic circuit.

Figure 18:
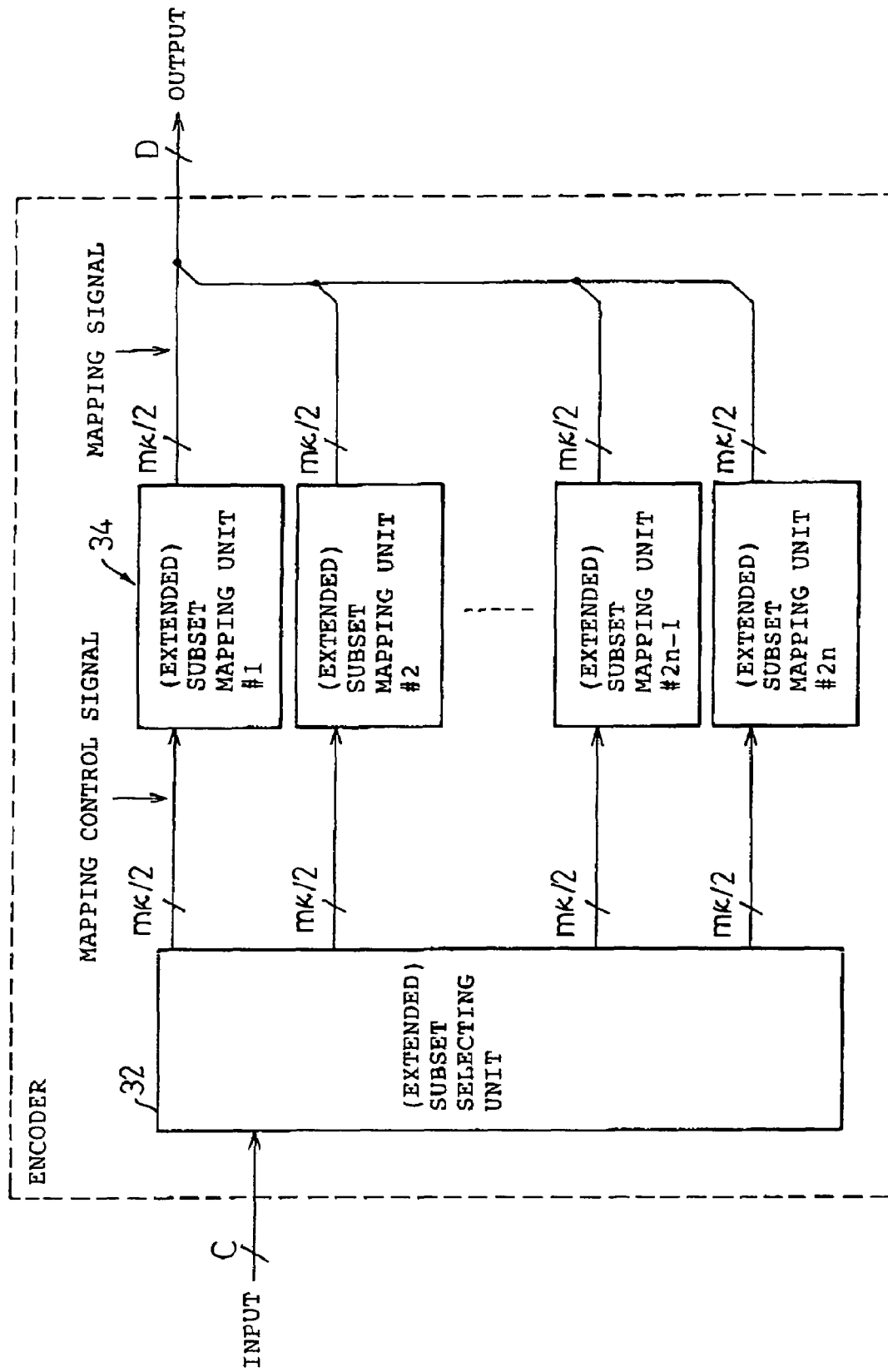
FIG. 18 is a block diagram showing a more generalized version of the encoder of FIG. 16.

FIG. 18 further generalizes the encoder of FIG. 16, and represents an encoder for producing all the kinds of codes thus far described.

An (extended) subset selecting unit 32, in accordance with C bits of input, selects the combinations of signal points that satisfy, for example, $\Delta\phi=\pi$, assigns the selected combinations of signal points to 2n subsets or extended subsets, and outputs mapping control signals indicating the assigned signal points. Since the signal points assigned to each subset (or extended subset) are identified with mκ/2 bits, the (extended) subset selecting unit 32 outputs an mκ/2-bit mapping control signal for each subset or extended subset.

In accordance with the mκ/2-bit mapping control signal input, each (extended) subset mapping unit 34 outputs an mκ/2-bit mapping signal indicating the I phase and Q phase values of signal points for κ/2 carriers.

Figure 19:
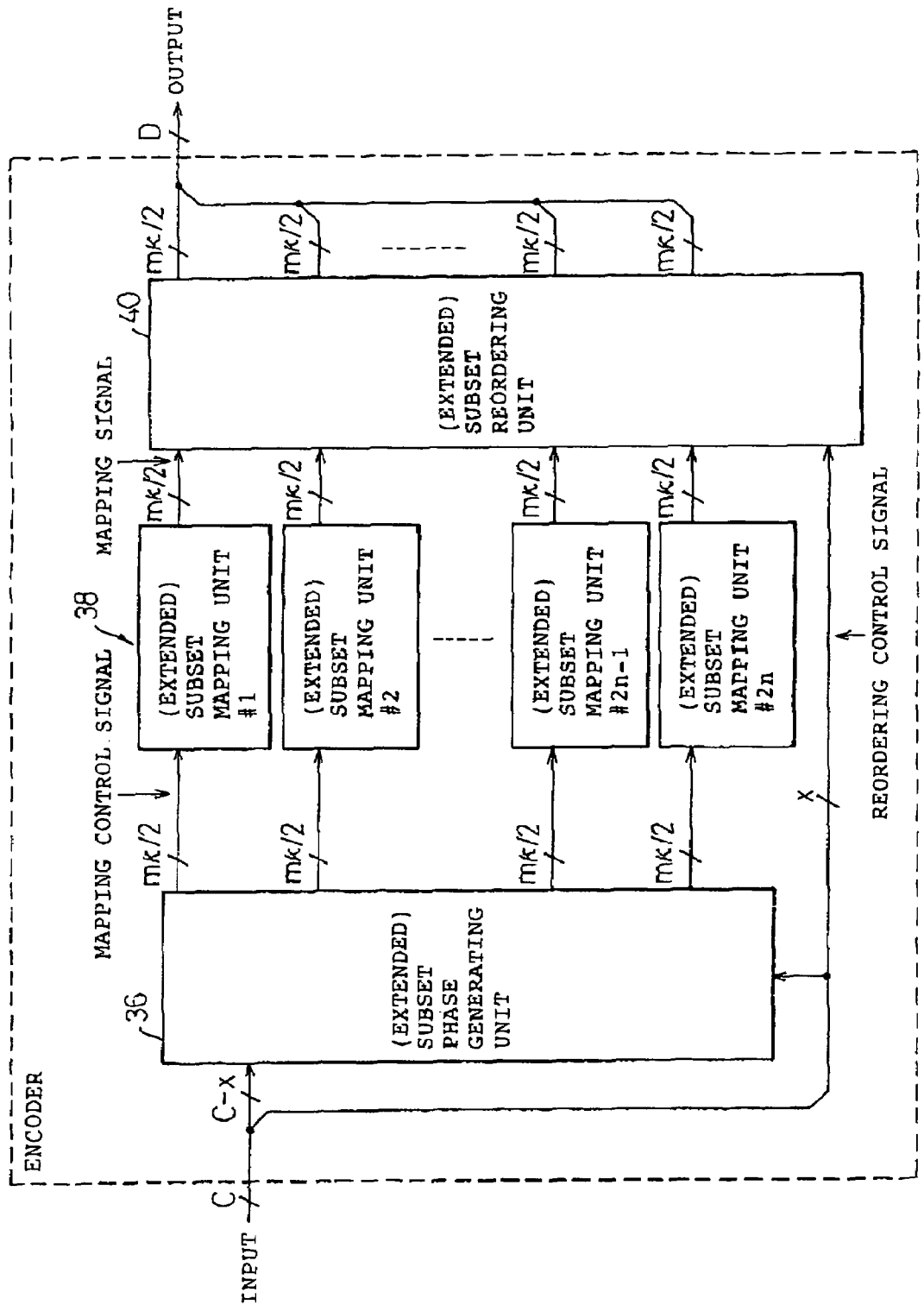
FIG. 19 is a block diagram showing a more generalized version of the encoder of FIG. 17.

FIG. 19 shows a modification of the encoder of FIG. 18, and represents an encoder for producing all kinds of codes thus far described, by further generalizing the representation of the encoder of FIG. 17.

An (extended) subset phase generating unit 36 determines the combinations of phases to be given to the carriers, and an (extended) subset reordering unit 40 performs reordering along the frequency axis on a subset by subset basis or on an extended subset by extended subset basis.

When constructing n kernels using i kinds of groups ($1 \leq i \leq \gamma = \min(n, G(m))$), the number of reorders, $C(n, i, m)$, is $$C(n, i, m) = \begin{cases} G(m)C_i \times \dfrac{(2n)!}{(n!)^2} & i = 1 \\ G(m)C_i \times \left\{ \displaystyle\sum_{n_1=1}^{N_1} \sum_{n_2=1}^{N_2} \cdots \sum_{n_{i-1}=1}^{N_{i-1}} \left\{ \dfrac{(2n)!}{\prod_{j=1}^{i}(n_j!)^4} \right\} \right\} & i \geq 2 \end{cases} \quad (39)$$

Their sum, i.e., the total number of reorders, $C(n, m)$, is given by $$C(n, m) = \sum_{i=1}^{\gamma} C(n, i, m) \quad (40)$$

$$\gamma = \min(n, G(m))$$

Accordingly, the required reordering bit count is $\lfloor \log_2 C(n, m) \rfloor = x$ bits. In the illustrated configuration, of the input information bits (C), x bits are input as a subset reordering control signal to the (extended) subset reordering unit 40, and the remaining C-x bits are input to the (extended) subset phase generating unit 36.

Some of the reordering control signal bits are input to the (extended) subset phase generating unit 36 to determine what kinds of kernels should be used and how many kernels. Then, the combination of phases for each subset or extended subset is determined in accordance with the input C-n bits from the combinations that satisfy $\Delta\phi = \pi$. The (extended) subset mapping units 38 are identical to the (extended) subset mapping unit 34 in FIG. 18. The (extended) subset reordering unit 40 performs reordering along the frequency axis on a subset by subset basis or on an extended subset by extended subset basis in accordance with the x-bit reordering control signal.

The transmitted signal encoded by the above encoder at the transmitting end is transmitted over a transmission channel with N carriers and received at the receiving end where the signal is decoded using, for example, a maximum-likelihood decoding method. That is, using maximum-likelihood decoding, a signal having C-bit width information representing the signal of one symbol period is decoded from the received D-bit width, κn-carrier received signal (γ)

$$\vec{\gamma} = (\vec{\gamma}_1, \vec{\gamma}_2, \ldots, \vec{\gamma}_{\kappa n})$$

More specifically, when the likelihood function of code c(i) is $$\lambda(c(i)) = \sum_{m=1}^{\kappa n} (\vec{s}_m(c(i)) - \vec{\gamma}_m)^2 \quad (41)$$

the decoded data is given as $$\text{choose } (\hat{\imath}) \text{ if } c(\hat{\imath}) = \min_{c(i)}\{\lambda(c(i))\}. \quad (42)$$

That is, the distance between the received signal $\vec{\gamma}$ and the code $\vec{s}$ (c(i)) is calculated, and $\hat{\imath}$ that provides the smallest distance is taken as the decoded data.

Figure 20:
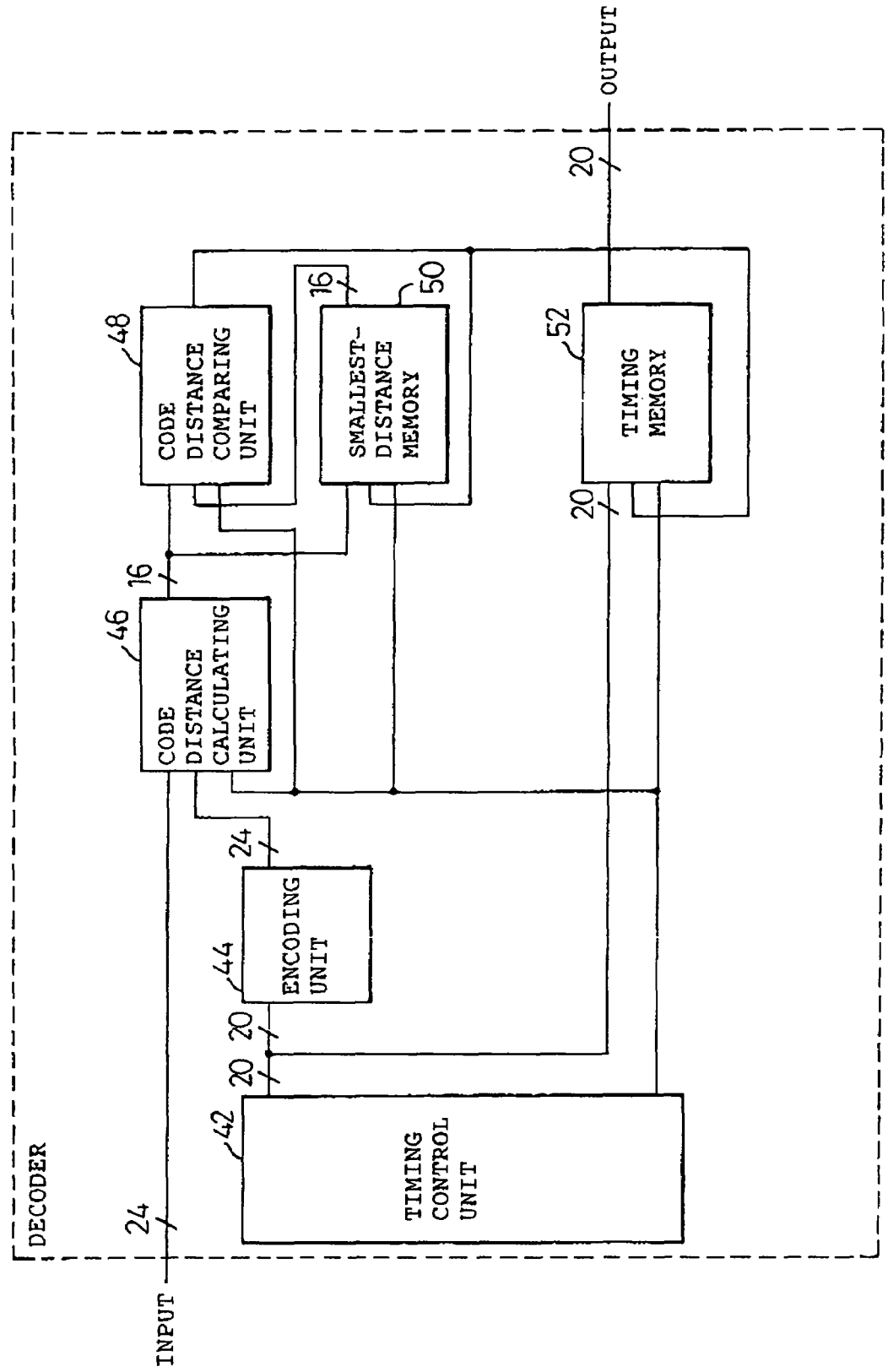
FIG. 20 is a block diagram showing the configuration of a decoder according to one embodiment of the present invention.

FIG. 20 shows the configuration of a decoder for decoding the code produced by the encoder of FIG. 16 or 17 having the coding rate 20/24, m=2, n=3, and κ=4 (k=1).

A timing control unit 42 outputs a 20-bit width signal that is incremented or decremented for every one clock timing and completes one cycle in one symbol period. An encoding unit 44, which is the same in configuration as the encoder of FIG. 16 or 17, encodes the 20-bit width signal output from the timing control unit 42 in accordance with the same algorithm as used at the transmitting end and outputs a 24-bit width code. A code distance calculating unit 46, using the equation (41), calculates the code distance from the received signal and the output of the encoding unit 44, and outputs the result as 16-bit width data. A code distance comparing unit 48 compares it with the smallest distance value stored in a smallest-distance memory 50 and, when the smallest distance is to be updated, updates the contents of the smallest-distance memory 50 and stores the output of the timing controller 42 at that instant in a timing memory 52. When the output of the timing control unit 42 completes one cycle, the contents of the timing memory 52 are output as the decoded data.

Figure 21:
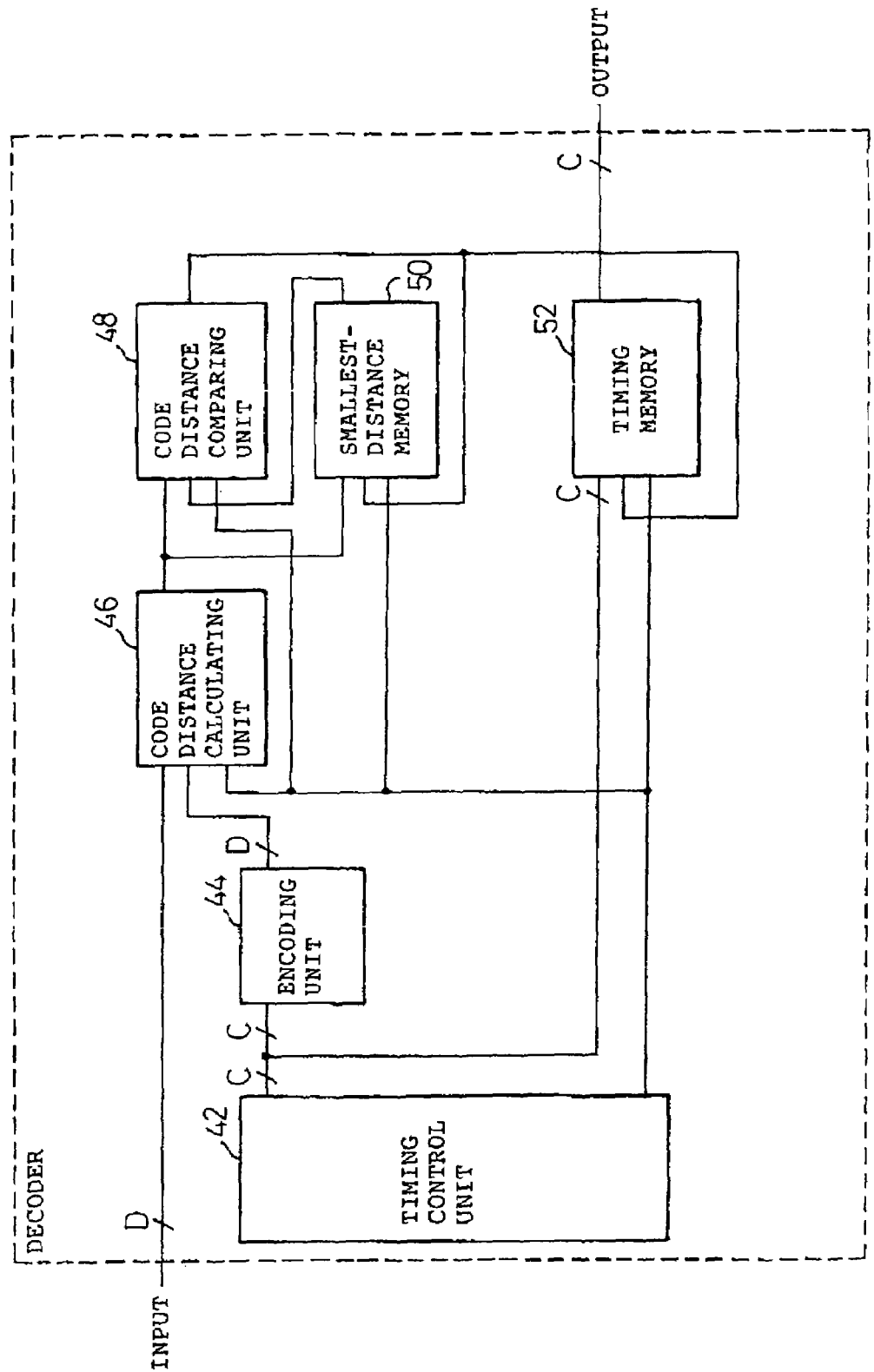
FIG. 21 is a block diagram showing the configuration of a more generalized version of the decoder of FIG. 20.

FIG. 21 shows the configuration of a decoder for decoding the code produced by the encoder of FIG. 18 or 19. The encoding unit 44 is the same in configuration as the encoder of FIG. 18 or 19. Otherwise, the operation is the same as that of the decoder of FIG. 20, except that the bit width is generalized, and therefore, the description will not be repeated here.

Figure 22:
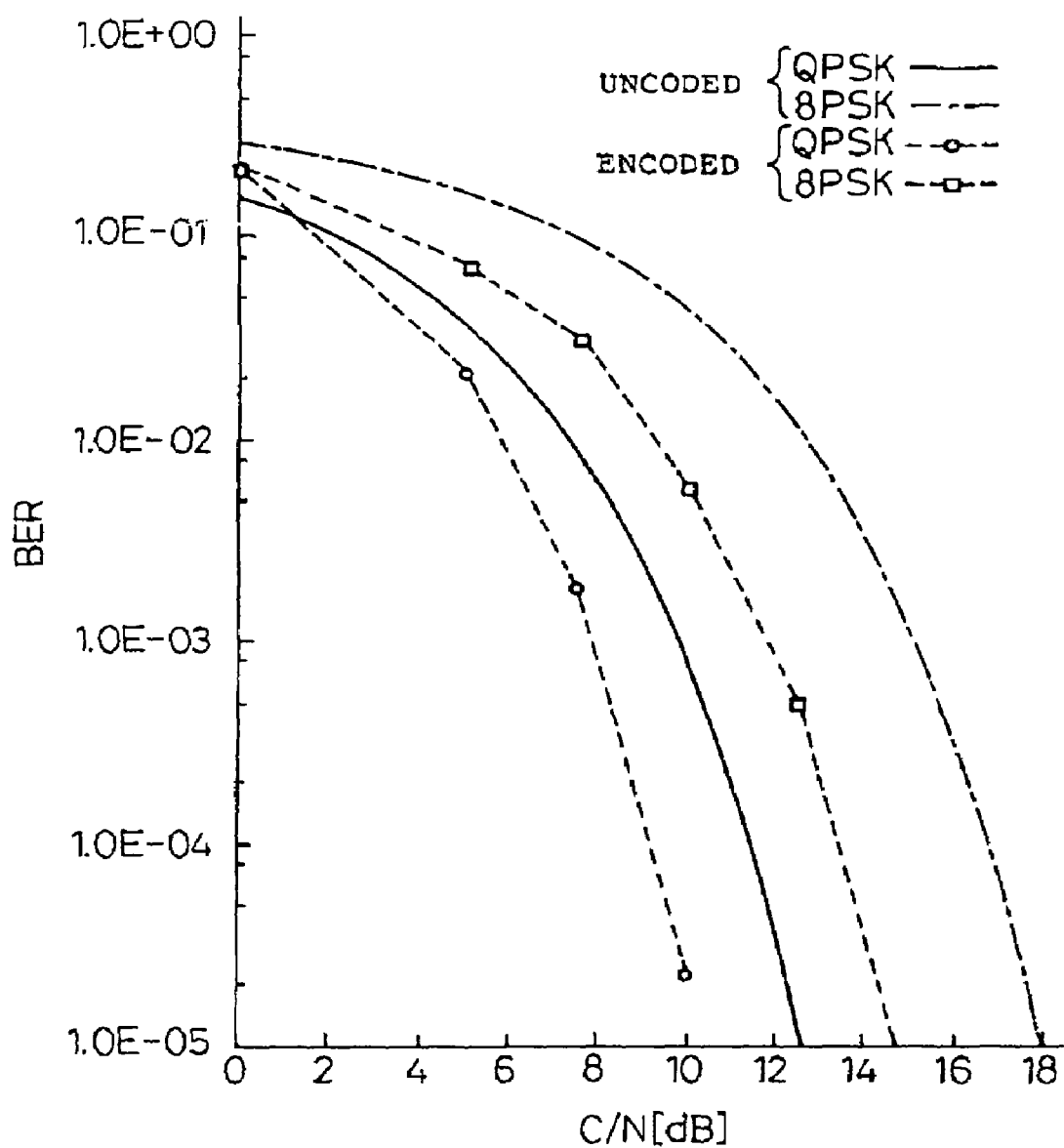
FIG. 22 is a graph showing the C/N versus BER performances for the code of the present invention when an external disturbance of thermal noise is applied.
Figure 23:
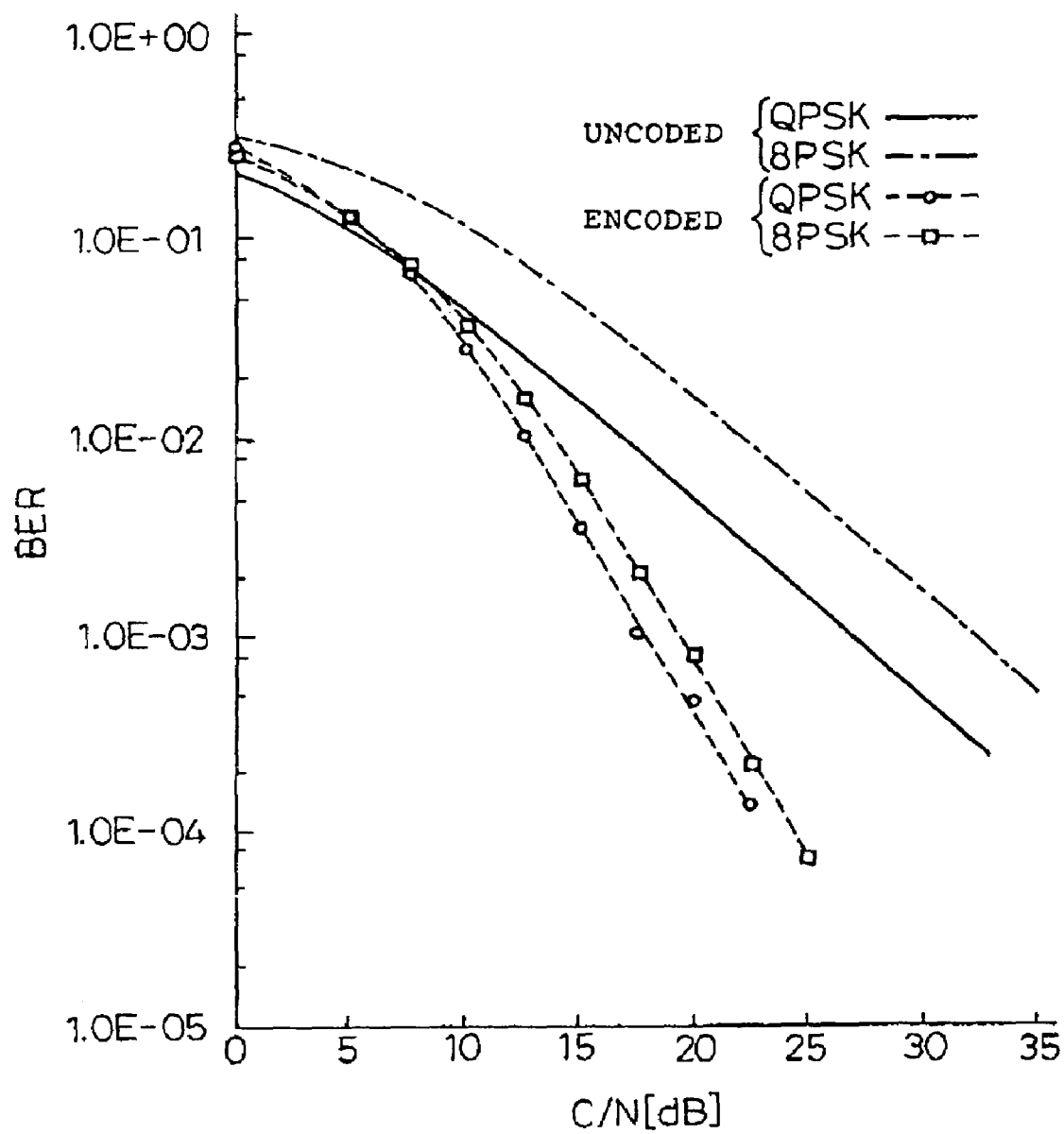
FIG. 23 is a graph showing the C/N versus BER performances for the code of the present invention in a fading environment.

The calculation results of the signal power (C/N) versus BER performances for the code of the present invention are shown in FIG. 22 (AWGN: Additive White Gaussian Noise) and FIG. 23 (fading). In either case, the κ=4 codes that satisfy $\Delta\phi(4)=\pi$ are shown, the modulation scheme used is QPSK (m=2) or 8PSK (m=3), and the number of carriers (N) is set to 8 or 4. At this time, the minimum free distance of the code is $d_{min}=\sqrt{2}\,d$, which means an increase by a factor of 2 in terms of the value of power. Improvements in performances are observed in all cases, and the same minimum free distance expansion effect can be obtained for the κ=4 codes that satisfy $\Delta\phi(4)=\pi, \pi/2$ simultaneously and also the codes that use extended subsets. Especially, in a fading environment, a more than 10 dB improvement in performance is achieved at BER=$10^{-3}$, and since the code of the invention is a block code that takes a multicarrier symbol as a unit, no interleavers are needed, offering the advantage of being able to drastically reduce the transmission delay.

The invention claimed is:

1. A decoding method for multicarrier signal comprising the steps of:

determining, based on each input signal, a plurality of phases containing one or more kernels each consisting of first to fourth phases that satisfy a phase condition that an absolute value of a difference of a phase difference $\Delta\theta(2^k)$, between $2^{k-1}$ second phases and $2^{k-1}$ first phases, from a phase difference $\Delta\theta^*(2^k)$, between $2^{k-1}$ fourth phases and $2^{k-1}$ third phases, $|\Delta\theta(2^k)-\Delta\theta^*(2^k)|$, be equal to a given value, where k is an integer not smaller than 1;

generating a plurality of codes corresponding to said input signal by assigning said plurality of phases to a plurality of carrier frequencies in such a manner as to satisfy a carrier allocation that a difference of $2^{k-1}$ carrier frequencies to which said second phases are assigned from $2^{k-1}$ carrier frequencies to which said first phases are assigned be equal to a difference of $2^{k-1}$ carrier frequencies to which said fourth phases are assigned from $2^{k-1}$ carrier frequencies to which said third phases are assigned, carrier frequencies to which said third phases are assigned having the same carrier allocation at those of said first phases;

calculating a code distance between each of said plurality of codes and a received code; and decoding said received code by determining an input signal that provides a code whose code distance to said received code is the smallest.

2. A multicarrier decoder comprising:

an encoding unit both for determining, based on each input signal, a plurality of phases containing one or more kernels each consisting of first to fourth phases that satisfy a phase condition that an absolute value of difference of a phase difference $\Delta\theta(2^k)$, between $2^{k-1}$ second phases and $2^{k-1}$ first phases, from a phase difference $\Delta\theta^*(2^k)$, between $2^{k-1}$ fourth phases and $2^{k-1}$ third phases, $|\Delta\theta(2^k)-\Delta\theta^*(2^k)|$, be equal to a given value, where k is an integer not smaller than 1, and for generating a plurality of codes corresponding to said input signal by assigning said plurality of phases to a plurality of carrier frequencies in such a manner as to satisfy a carrier allocation that a difference of $2^{k-1}$ carrier frequencies to which said second phases are assigned from $2^{k-1}$ carrier frequencies to which said first phases are assigned be equal to a difference of $2^{k-1}$ carrier frequencies to which said fourth phases are assigned from $2^{k-1}$ carrier frequencies to which said third phases are assigned, carrier frequencies to which said third phases are assigned having the same carrier allocation as those of said first phases;

a code distance calculating unit for calculating a code distance between each of said plurality of codes and a received code; and a smallest-distance code selecting unit for decoding said received code by determining an input signal that provides a code whose code distance to said received code is the smallest.

* * * * *